(12) United States Patent
Zheng

(10) Patent No.: US 11,300,254 B2
(45) Date of Patent: Apr. 12, 2022

(54) PLANT LAMP, CONTROL METHOD, AND CONTROL SYSTEM

(71) Applicant: Shenzhen Long Sun Optoelectronics Technology Co., Ltd., Shenzhen (CN)

(72) Inventor: Zebin Zheng, Shenzhen (CN)

(73) Assignee: SHENZHEN LONG SUN OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/352,344

(22) Filed: Jun. 20, 2021

(65) Prior Publication Data

US 2022/0057054 A1 Feb. 24, 2022

(30) Foreign Application Priority Data

Aug. 21, 2020 (CN) .......................... 202021777760.0
May 22, 2021 (CN) .......................... 202110570090.8

(51) Int. Cl.
  *F21S 2/00* (2016.01)
  *F21V 23/00* (2015.01)
  (Continued)

(52) U.S. Cl.
  CPC .............. *F21S 2/005* (2013.01); *A01G 7/045* (2013.01); *F21V 23/001* (2013.01); *F21V 23/003* (2013.01); *F21V 31/005* (2013.01)

(58) Field of Classification Search
  CPC ........ F21S 2/005; A01G 7/045; F21V 23/001; F21V 23/003; F21V 31/005
  See application file for complete search history.

(56) References Cited

U.S. PATENT DOCUMENTS 9,016,892 B1 * 4/2015 Scribante .............. F21V 17/002
  362/222
9,518,724 B2 * 12/2016 Kwak ..................... F21V 21/00
(Continued)

FOREIGN PATENT DOCUMENTS

CN        102355779 A    2/2012
CN        108709169 A   10/2018
CN        109287033 A    1/2019

OTHER PUBLICATIONS

U.S. Appl. No. 14/327,063, filed Jul. 9, 2014, Westbridge Automation (Xiamen) Co., Ltd.
(Continued)

*Primary Examiner* — Tsion Tumebo
(74) *Attorney, Agent, or Firm* — Andrew C. Cheng

(57) ABSTRACT

A plant lamp includes a radiator member, a power box, and lamp beads. The radiator member includes an upper surface, a lower surface opposite to the lower surface, and side surfaces connected between the upper surface and the lower surface. The power box and the lamp beads are arranged on the upper surface and the lower surface respectively. The power box is electrically connected to the lamp beads. The plant lamp further includes at least one power socket electrically connected to the power box and a wiring module. At least one side surface of the radiator member is provided with a fixing seat, the fixing seat defines a slot capable of engaging with a quick lock. When the two plant lamps are to be assembled, the fixing seats of the two plant lamps close to each other, and the quick lock runs through the slots of the fixing seats of the two plant lamps to lock the two plant lamps together.

20 Claims, 17 Drawing Sheets

(51) Int. Cl.
*A01G 7/04* (2006.01)
*F21V 31/00* (2006.01)

(56) References Cited

U.S. PATENT DOCUMENTS

| | | | | |
|---|---|---|---|---|
| 9,943,042 B2* | 4/2018 | Thosteson | ............. | F21V 23/003 |
| 10,571,084 B2* | 2/2020 | Jang | ........................ | F21S 2/005 |
| 11,033,752 B2* | 6/2021 | Strahan | ................ | A61N 5/0616 |
| 2001/0047618 A1* | 12/2001 | Fang | ....................... | A01G 7/045 |
| | | | | 47/65.5 |
| 2007/0058368 A1* | 3/2007 | Partee | .................... | A01G 9/249 |
| | | | | 362/231 |
| 2009/0021936 A1* | 1/2009 | Stimac | ................. | F21V 23/009 |
| | | | | 362/249.02 |
| 2010/0328945 A1* | 12/2010 | Song | ....................... | F21V 29/75 |
| | | | | 362/240 |
| 2011/0285292 A1* | 11/2011 | Mollnow | .............. | F21V 29/717 |
| | | | | 315/113 |
| 2012/0062152 A1* | 3/2012 | Sanfilippo | ............... | F21S 2/005 |
| | | | | 315/312 |
| 2012/0218758 A1* | 8/2012 | Wang | ..................... | F21S 8/086 |
| | | | | 362/244 |
| 2015/0167948 A1* | 6/2015 | Wasserman | ............. | F21S 2/005 |
| | | | | 362/249.01 |
| 2016/0366834 A1* | 12/2016 | Martin | .................... | F21V 17/10 |
| 2017/0184284 A1* | 6/2017 | Van Winkle | ............ | F21V 23/04 |
| 2020/0037414 A1* | 1/2020 | Deng | ..................... | A01G 7/045 |
| 2020/0196536 A1* | 6/2020 | Pasini | ....................... | F21V 3/02 |
| 2020/0400297 A1* | 12/2020 | Hou | ....................... | H05B 45/20 |

OTHER PUBLICATIONS

U.S. Appl. No. 15/486,349, filed Apr. 13, 2017, Talent Key Holdings Limited.
U.S. Appl. No. 16/045,722, filed Jul. 25, 2018, Jinsheng Deng Every Industry LLC.
U.S. Appl. No. 13/299,704, filed Nov. 18, 2011, James Sanfilippo Alan McFarland NILA Inc.

* cited by examiner

PLANT LAMP, CONTROL METHOD, AND CONTROL SYSTEM

FIELD

The subject matter herein generally relates to plant growth lighting technology, and particularly relates to a plant lamp, a control method and a control system for controlling the plant lamp.

BACKGROUND

A plant lamp, as the name implies, is used to prompt growth of plants. Plant lamps can simulate sunlight irradiation on the plant to make the plant carry on photosynthesis, thus serving as supplement or substitute for sunlight.

In different planting situations, illumination area and intensity of plant lamps are often needed to be changed. Users need to adjust illumination area and intensity of the plant lamps according to actual situations. However, the structures of existing plant lamps are fixed and cannot be assembled quickly. Furthermore, the control modes of the existing plant lamps are relatively simple and cannot be controlled according to actual situations.

SUMMARY

In order to solve the problem that the existing plant lamps cannot be assembled quickly, the present disclosure provides a plant lamp, a control method and a control device for controlling the plant lamp.

In order to solve the above-mentioned problem, an embodiment of the present disclosure provides a plant lamp, including a radiator member, a power box, and lamp beads, wherein the radiator member includes an upper suffice, a lower surface opposite to the lower surface, and side surfaces connected between the upper surface and the lower surface, the power box and the lamp beads are arranged on the upper surface and the lower surface respectively, and the power box is electrically connected to the lamp beads; the plant lamp further includes at least one power socket electrically connected to the power box and a wiring module; at least one side surface of the radiator member is provided with a fixing seat, the fixing seat defines a slot capable of engaging with a quick lock; wherein when the two plant lamps are to be assembled, the fixing seats of the two plant lamps close to each other, and the quick lock runs through the slots of the fixing seats of the two plant lamps to lock the two plant lamps together.

Preferably, the radiator member is one of a three-dimensional triangle, a three-dimensional rectangle, a three-dimensional regular pentagon, a three-dimensional regular hexagon, or a three-dimensional regular octagon.

Preferably, the radiator member is a three-dimensional rectangle each side surface of the radiator member is provided with at least two fixing seats at interval 4. The plant lamp according to claim 1, wherein the slot includes a through hole and a groove, a side of the fixing seat close to a joint between two plant lamps is taken as an outer side, and a side of the fixing seat opposite to the outer side is an inner side; the through hole runs through the outer side and the inner side, the groove is arranged on the inner side and extends from a center of the through hole in two opposite directions; one end of the quick lock is provided with an axis pin; when two plant lamps are assembled, the axis pin goes through the through holes of two adjacent fixing seats and then rotates 90 degrees and is engaged into a groove of one of the two adjacent fixing seats.

Preferably, the at least one power socket is arranged on a side of the power box, the power box is further provided with at least one data line socket arranged on a side of the power box opposite to the at least one power socket, both the number of the at least one power socket and the number of the at least one data line socket are two.

Preferably, the plant lamp further includes a PCB arranged on the lower surface of the radiator member, the lamp beads are arranged on the PCB away from the radiator member; the wiring module is arranged at a center of the PCB, both the power socket and the data line socket are connected to the wiring module through the power box; the data line socket is configured to be connected to an external operate terminal to achieve a wired control of the plant lamp.

Preferably, the wiring module is provided with a communication module configured to receive wireless signals to control the plant beads to emit light wirelessly.

Preferably, the upper surface of the radiator member is provided with a recess, the power box is detachably connected in the recess.

Preferably, the plant lamp further includes a power box waterproof ring configured to seal a joint between the power box and the recess.

Preferably, the plant lamp further includes a light-transmitting board, the light-transmitting board is connected to the lower surface of the radiator member to form an accommodating space for receiving the PCB and the lamp beads.

Preferably, the plant lamp further includes a board waterproof ring configured to seal a joint between the light-transmitting board and the radiator member.

In order to solve the above-mentioned problem, the present disclosure further provides a control method for plant lamps configured to control at least two plant lamps of claim 1, the at least two plant lamps are detachably assembled together through the quick locks, the power sockets of any two adjacent plant lamps are electrically connected, and the wiring modules of any two adjacent plant lamps are connected by communication, the control method includes the following steps: the wiring module of each plant lamp uniformly obtaining execution parameters, the execution parameters comprise phases included in a planting process, execute periods in each day within each phase, and illumination intensity in each execute period; synchronizing the current time with the local time in user's zone; matching the current time with a corresponding execute period, and controlling the plant lamps to emit light according to the illumination intensity corresponding to the corresponding execute period.

Preferably, the wiring module of each plant lamp obtains the execution parameters uniformly in a wired or wireless way.

Preferably, the execution parameters are customized inputted by a user or is obtained by calling a predetermined parameter model.

Preferably, the execute periods are determined by dividing 24 hours of a day successively, and each execute period is circularly performed in a phase.

In order to solve the above-mentioned problem, the present disclosure further provides a control system for plant lamp configured to control at least two plant lamps of the above embodiments, the at least two plant lamps are detachably assembled together through the quick locks, the power sockets of any two adjacent plant lamps are electrically connected, and the wiring modules of any two adjacent plant lamps are connected by communication, the control system includes a operate terminal and a time synchronization module; the operate terminal is configured to provide execution parameters needed by the plant lamps uniformly, the execution parameters comprise phases included in a planting process, execute periods in each day within each phase, and illumination intensity in each execute period; the time synchronization module is configured to synchronize the current time with the local time in user's zone and feedback the current time to the operate terminal; the operate terminal receives the current time from the time synchronization module, match the current time with a corresponding execute period, and control the plant lamps to emit light according to the illumination intensity corresponding to the corresponding execute period.

Preferably, the operate terminal provides the execution parameters to each plant lamp in a wired or wireless way.

Preferably, the wiring module of each plant lamp includes a communication module configured to generate an IP node, each plant lamp is connected to the operate terminal by the IP node of corresponding communication module.

Preferably, the control system further includes a control box configured to be electrically connected with any one of the plant lamps and to generate a uniform IP node; the control box is connected to the operate terminal by the uniform IP node, the operate terminal controls the plant lamps uniformly through the control box.

Preferably, the control box is provided with a single-chip module configured to receive and store the execution parameters, the control box controls the plant lamps to perform the execution parameters stored in the single-chip module when the control box is disconnected from the operate terminal.

Comparing with existing plant lamps, the plant lamps, the control method and the control system provided by the present disclosure have the following advantages:

The plant lamp provided of the present disclosure is provided with a fixing seat and a corresponding quick lock, which makes the plant lamp of the present disclosure not only can be used as a single lamp, but also can be assembled with plant lamps according to actual requirements. That is, illumination area can be increased or decreased by increasing or decreasing the number of the plant lamps assembled. Furthermore, assembling or disassembly of the plant lamps facilitate miniaturization and standardization of a single plant lamp 20 and is convenient for transportation and assembling. Cost for transportation and assembling can be thus decreased. Assembled plant lamps can function as an integrally formed lamp and does not affect large scale planting. Furthermore, in an initial planting stage, a user can choose the number of plant lamps 20 to be purchased according to an initial planting area to save initial cost. In the later stage, if the planting area needs to be enlarged, the user can purchase the same plant lamps 20 for assembly. If the user wants to decrease the planting area, the user can also remove corresponding number of plant lamps 20 at any time to save power. Thus, the plant lamp 20 can reduce cost for the user and improve user experiences.

The radiator member 21 of the present disclosure is a three-dimensional rectangle, which can make edges of assembled plant lamps flat, so that light intensity of the edges can be kept uniform. Furthermore, each side of the radiator member 21 is provided with at least two fixing seats 201 at interval, which can increase the number of fixing points, thus enhancing a connection between each two plant lamps 20.

The slot of the present disclosure includes a through hole and a groove, and is capable of matching with the quick lock so as to achieve quick assembly of the plant lamps. Furthermore, the groove can prevent the quick lock from sliding out of the slot, which greatly improve stability of the quick lock.

The power box of the present disclosure is provided with two power sockets. When two plant lamps are assembled together, the power sockets of the two power sockets can be connected with a conductive line so as to achieve a uniform electrical control of the two plant lamps. When more than two plant lamps are assembled together, any two adjacent plant lamps can be electrically connected with a conductive line so as to achieve a uniform electrical control of the more than two plant lamps.

The power box of the present disclosure is provided with two data line sockets. One of the two data line sockets can be connected to the operate terminal with a data line so as to achieve a wired control of the plant lamp. Furthermore, if a plurality of plant lamps are assembled together, any two adjacent plant lamps can be connected with a data line so as to form a uniform controllable data network, thus achieving uniform control of the plurality of plant lamps assembled together.

In the present disclosure, the data line socket is connected to the wiring module so as to achieve wired control of the plant lamp. Furthermore, through the communication module, a wireless control of the plant lamp is achieved.

In the present disclosure, the recess defined on the radiator member 21 is configured to receive the power box. During assembling or disassembling of the power box, components inside the power box can be limited in the recess, which prevents the components inside the power box from slipping and being gone.

In the present disclosure, the power box waterproof ring improves waterproof performance so as to avoid short circuit.

In the present disclosure, the light-transmitting board together with the lower surface of the radiator member forms an accommodating space for accommodating the PCB and the lamp beads, which can prevent dust from going into the accommodating space.

In the present disclosure, the board ring is arranged between the lower surface of the radiator member and the light-transmitting board, which can prevent moisture from going into the accommodating space to damage circuit on the PCB.

The control method of the present disclosure can synchronize the current time with the time in the user's zone, that is synchronization of local time. Illuminating intensity of the plant lamps can be determined by matching the current time with corresponding execute periods so as to achieve dimming of the plant lamps. It should be understood that, the current time can reflect accurately each time point from sunrise to sunset. Different execute periods can divide the process from sunrise to sunset of a day into multiple segments. Therefore, matching the current time with the execute periods can reflect each segment of local sunlight. Since each execute period corresponds to an corresponding illumination intensity, the illumination intensity of the plant lamps can be adjusted as time goes by. That is, the plant lamps can be adjusted to simulate sunlight to make planted plant can growth under the nature law of sunlight in the user's zone, which can resolve the problems that existing plant lamps cannot adjusted and plant cannot grow naturally. Furthermore, synchronization of local time can break regional limitation, especially in current globalized market, the present disclosure can make the plant lamp in different countries and different regions accurately match local time to emit light, greatly improving the practicability and convenience of the plant lamp.

The control method of the present disclosure, a user can customize execution parameters, and can set unconventional execution parameters according to his own planting experiences or special plants; or, the user can directly call a predetermined parameter model by one key. The predetermined parameter model can be prestored inside the system, or a model defined and stored by the user himself. The two ways for setting the execution parameters can be selected according to user's actual requirements, which improve convenience and practicability.

The control method of the present disclosure, the execute periods are determined by dividing 24 hours of a day. Each execute period is circularly performed once each 24 hours in a phase. That is, in a phase, illumination states of the plant lamps are repeatedly performed by day until the phase is completed. This way can simplify internal calculations and make dimming of the plant lamps more smoothly. Interruption or overlapping of the execute periods will does not occur.

The operate terminal of the present disclosure can control the plant lamps wirelessly. In this way, existing mobile devices, such as a mobile phone, can be used as an operate terminal. The mobile phone can control the plant lamps as long as being install with an APP.

The control system of the present disclosure can control the plant lamps by a control box. It should be understood that, if the number of the plant lamps assembled together is too large, and the operate terminal is directly connected to the communication module of each plant lamp, the operate terminal needs to match large number of Internet protocol address (that is, IP node) to each plant lamp, which is easy to cause network congestion and delay. By setting the control box 30, only one uniform IP node is needed to be matched to the control box 30, since the plant lamp 20 forms a wired network through the connecting lines 204, the control box 30 only needs to be electrically connected to the wired network to uniformly control the plant lamps 20 assembled together. That is, only one uniform IP node is needed to achieve uniform control of the plant lamps, which can effectively avoid network congestion and delay and especially suitable for large scale planting and a large number of plant lamps assembled together.

The control box of the present disclosure is provided with a single-chip module configured to receive and store the execution parameters. When the control box is disconnected from the operate terminal the control box controls the plant lamps to execute the execution parameters stored in the single-chip module. By setting the single-chip module, when the execution parameters of the operate terminal cannot be obtained due to network interruption, the control box can use the same execution parameters stored in the single-chip module to continue to control the plant lamps to emit light, so as to avoid abnormal growth of plants caused by illumination interruption.

BRIEF DESCRIPTION OF THE DRAWINGS

In order to more clearly descript implementations of the present disclosure, the following will made reference to the attached figures. Obviously, the drawings are shown for illustrative purpose only, for an ordinary person skilled in the art, other drawings obtained from these drawings without paying creative labor should be within scope of the present disclosure.

NUMERICAL REFERENCE IDENTIFICATION

1. Control system;
10. Operate terminal; 20. Plant lamp; 21. Radiator member; 22. Open frame power supply; 23. Power box; 24. PCB; 25. Lamp bead; 26. Wiring module; 27. Power box ring; 28. Board ring; 29. Light-transmitting board; 30. Control box; 40. Time synchronization module;
201. Fixing seat; 202. Quick lock; 203. Power socket; 204. Connecting line; 205. Electrical plug; 206. Data line socket; 207. Data line; 208. External data line; 209. Communication module; 210. Slot; 211. Bolt; 212. Connecting piece; 230. Case; 231. Power screw; 241. PCB screw; 291. Board screw; 301. Control button; 302. Input port 302; 303. Wireless receiving device; 304. Single-chip module;
2011. Slot; 2012. Through hole; 2013. Groove; 2021. Axis pin; 2022. Hand board.

DETAILED DESCRIPTION

In order to make the objects, technical solutions and advantages of the invention clearer, the invention will be further described in detail in combination with the drawings and the embodiments. It should be understood that the embodiments described herein are only used to explain the invention and are not used to limit the invention.

It should be noted that, when an element is considered to be "fixed" to another element, it can be directly fixed on another element or a centered element arranged between the element and another element, when an element is considered to be "connected" to another element, it can be directly connected to another element or may also have a centered element. It should be further noted that terms such as "vertical", "horizontal", "left", "right" or the like are just used to facilitate description of the present disclosure.

Figure 1:
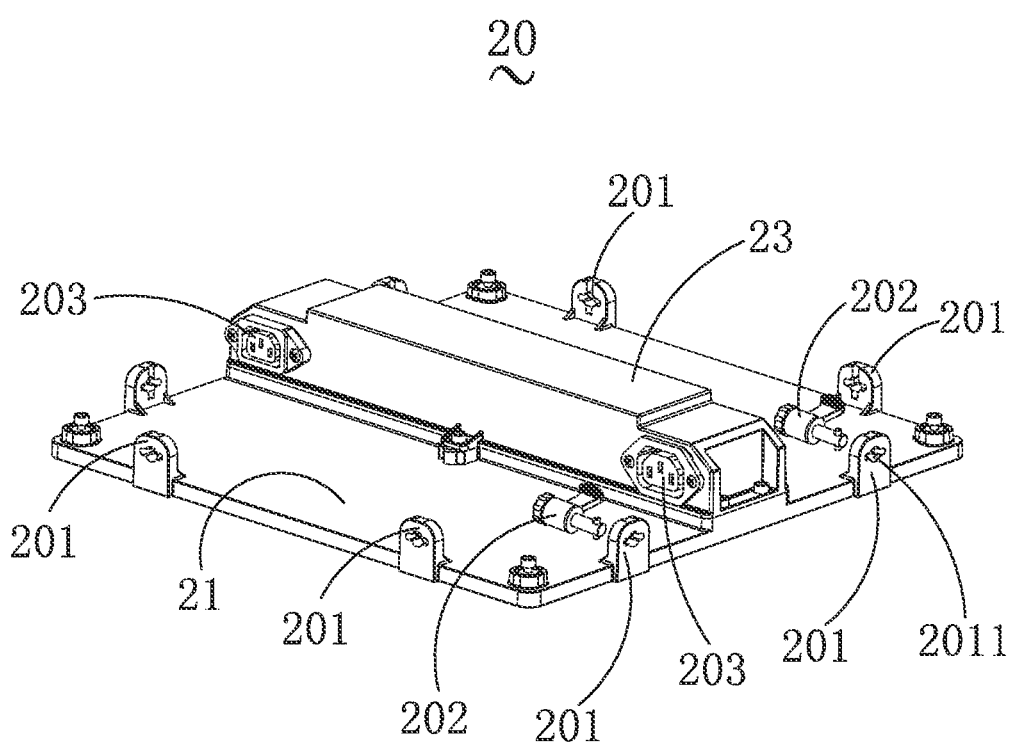
FIG. 1 is a schematic view of a plant lamp according to a first embodiment of the present disclosure.
Figure 2:
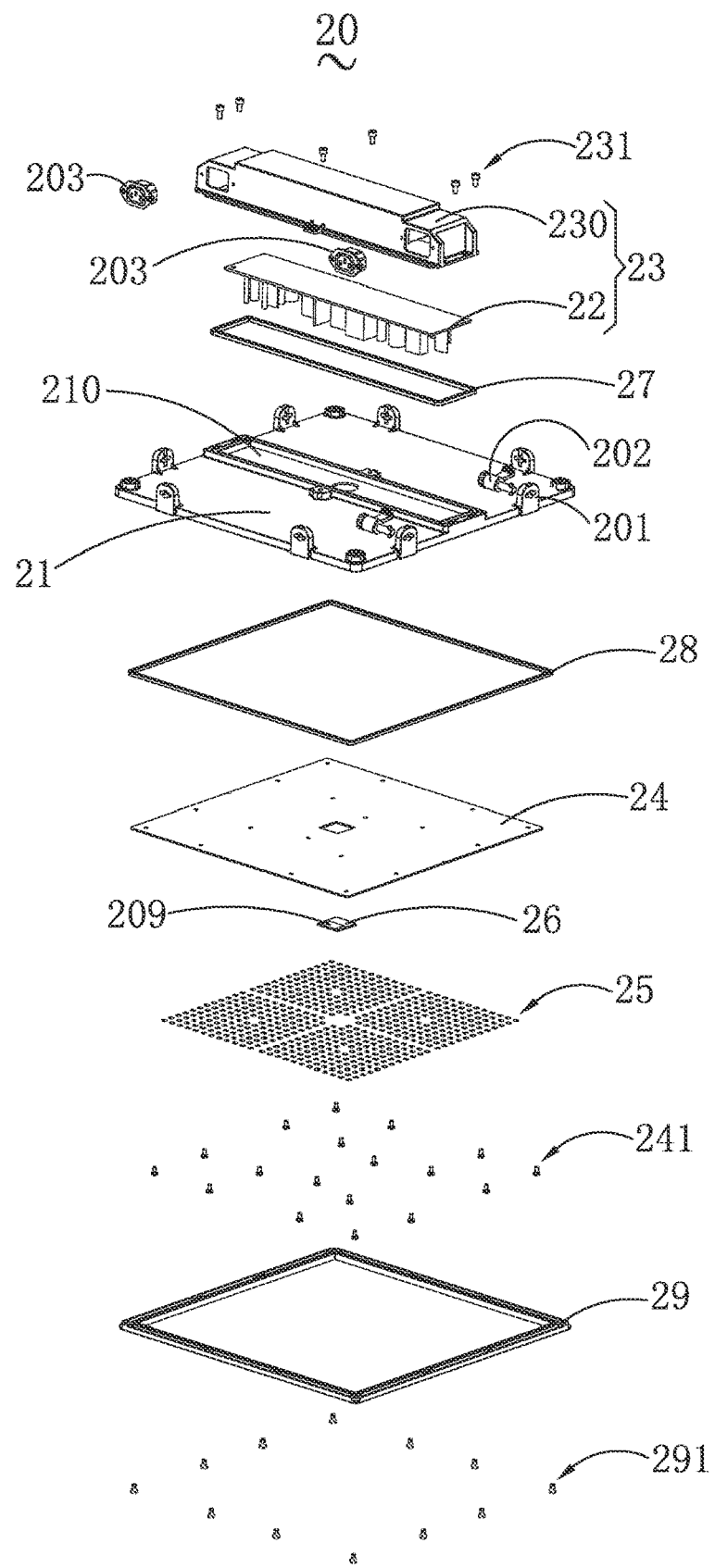
FIG. 2 is an exploded view of the plant lamp of FIG. 1.

Referring to FIGS. 1-2, a first embodiment of the present disclosure provides a plant lamp 20, including a radiator member 21, a power box 23, and lamp beads 25. The radiator member 21 includes an upper surface, a lower surface opposite to the upper surface, and a plurality of side surfaces connected to the upper surface and the lower surface. The power box 23 and the lamp beads 25 are arranged on the upper surface and the lower surface of the radiator member 21 respectively, and the power box 23 is electrically connected to the lamp beads 25. It should be understood that, Main supply is provided to the power box 23 and is voltage and current stabilized by the power box 23 and then supplied to the lamp beads 25, the lamp beads 25 can be LEDs. A plurality of lamp beads 25 can be evenly arranged on the lower surface of the radiator member 21, so that light emitted by the lamp beads 25 can illuminate the plant to provide desired light.

Additionally, at least one of the side surfaces of the radiator member 21 is provided with a fixing seat 201. The fixing seat 201 defines a slot 2011 configured to be engaged with a quick lock 202. When assembling two plant lamps 20 together, fixing seats 201 of the two plant lamps are close to each other so that the quick lock 202 can pass through corresponding slots 2011 of the fixing seats 201 to fixedly lock the two plant lamps 20 together.

It should be understood that, by arranging the fixing seat 201 on the side surface of the radiator member 21 configured to be engaged with the quick lock 202, the plant lamp 20 of the present disclosure not only can be used as a single lamp alone, but also can be assembled with one or more plant lamps 20. Illumination area can be changed by increasing or decreasing the number of the plant lamps 20 assembled together to meet requirements of different planting areas. In addition, assembling or disassembly of the plant lamps facilitate miniaturization and standardization of a single plant lamp 20 and is convenient for transportation and assembling. Cost for transportation and assembling can be thus decreased. Assembled plant lamps can function as an integrally formed lamp and does not affect large scale planting. Furthermore, in an initial planting stage, a user can choose the number of plant lamps 20 to be purchased according to an initial planting area to save initial cost. In the later stage, if the planting area needs to be enlarged, the user can purchase the same plant lamps 20 for assembly. If the user wants to decrease the planting area, the user can also remove corresponding number of plant lamps 20 at any time to save power. Thus, the plant lamp 20 can reduce cost for the user and improve user experiences.

Optionally, the radiator member 21 can be in a shape selected from: three-dimensional regular triangle, three-dimensional rectangle, three-dimensional regular pentagon, three-dimensional regular hexagon or three-dimensional regular octagon. Specifically, in the embodiment of the present disclosure, the radiator member 21 is in a shape of a three-dimensional rectangle, preferably a three-dimensional square. The radiator member 21 is a three-dimensional rectangle, which can make edges of assembled plant lamps flat, so that light intensity of the edges can be kept uniform. Furthermore, the radiator member 21 is a three-dimensional square, that is, the four sides of the radiator member 21 are equal, and can be provided with same fixing seats 201. Therefore, a second plant lamp 20 can be fixed on any one of the sides of a first plant lamp 20 to be assembled together with the first plant lamp 20. Thus, it can increase flexibility of assembly and has stronger practicability.

Additionally, in an embodiment, the radiator member 21 can be a three-dimensional rectangular, each side of the radiator member 21 is provided with at least two fixing seats 201 at interval. Such arrangement can increase the number of fixing points, which can enhance fixing between each two plant lamps 20.

Additionally, the upper surface of the radiator member 21 defines a recess 210, and the power box 23 is detachably arranged in the recess 210.

Additionally, the power box 23 can be connected to the upper surface with clamping structures or bolts. In detail, in an embodiment, the power box 23 is connected to the radiator member 21 with a power screw 231. Adoption of the power screw 231 facilitate connection between the power box 23 and the radiator member 21 and enhance connecting between the power box 23 and the radiator member 21.

Additionally, the power box 23 includes a case 230 and an open frame power supply 22. When the power box 23 is arranged in the recess 210, the case 230 covers the recess 210 to form an accommodating space for receiving the open frame power supply 22.

Additionally, the plant lamp 20 further includes a power box waterproof ring 27. The power box waterproof ring 27 seals a joint between the power box 23 and the upper surface. Such arrangement can improve waterproof performance of the power box 23 so as to protect the power box 23 from short circuit.

Additionally, the plant lamp 20 further includes a circuit board. In an embodiment, the circuit board can be a printed circuit board (PCB) 24. The PCB 24 is arranged on the lower surface of the radiator member 21, the lamp beads 25 are arranged on a side of the PCB 24 away from the radiator member 21. A wiring module 26 is arranged at a center of the PCB 24, the lamp beads 25 are connected to the wiring module 26 through printed circuits of the PCB 24, and connected to the power box 23 through the wiring module 26.

Optionally, the PCB 24 can be connected on the lower surface of the radiator member 21 by adhesive, clamping or welding structures. In detail, in an embodiment, the PCB 24 is connected on the lower surface of the radiator member 21 with PCB screws 241. Through the PCB screws 241, the PCB 24 can be easily fixed, which can enhance connection between the PCB 24 and the radiator member 21.

Additionally, the wiring module 26 can be provided with communication module 209, through which wireless control signals can be received to control the lamp beads 25 to emit light. Therefore, the plant lamp 20 being controlled by wireless control signals can be realized.

Additionally, the plant lamp 20 further includes a light-transmitting board 29. The light-transmitting board 29 is connected to the lower surface of the radiator member 21 to form a receiving space for receiving the PCB 24 and the lamp beads 25.

Optionally, the light-transmitting board 29 can be connected to the lower surface of the radiator member 21 with clamping structures and bolts. In detail, in an embodiment, the light-transmitting board 29 is connected to the lower surface of the radiator member 21 with board screws 291.

Additionally, the plant lamp 20 further includes a board waterproof ring 28. The board waterproof ring 28 seals a joint between the light-transmitting board 29 and the lower surface of the radiator member 21. It can be understood that, the radiator member 21, the board waterproof ring 28 and the light-transmitting board 29 cooperate to form a sealed receiving space. The PCB 24 and the lamp beads 25 are arranged inside the sealed receiving space, thus improving waterproof performance.

Additionally, a side of the power box 23 is provided with a power socket 203. One end of the power socket 203 is electrically connected to the power box 23, and the other end of the power socket 203 extends out of the power box 23 to be connected to the Main supply. It can be understood that, the power socket 203 can be connected to the Main supply with conductive lines. The Main supply is electrically connected to the lamp beads 25 through the power socket 203, the power box 23, the wiring module 26, and then the printed circuits of the PCB 24, therefore, the power supplied by the Main supply can be transmitted to the lamp beads 25.

In detail, each plant lamp 20 can be provided with two power sockets 203. When two plant lamps 20 being assembled together, the two lamps 20 can be electrically connected by interconnecting corresponding power sockets 203 thereof with a conductive line. Therefore, unified electrical control of two plant lamps 20 can be achieved. When more than two plant lamps 20 being assembled together, the more than two plant lamps 20 can be electrically connected by interconnecting corresponding power sockets 203 of each adjacent plant lamps 20, unified electrical control of the more than two plant lamps 20 thus can be achieved.

Figure 3:
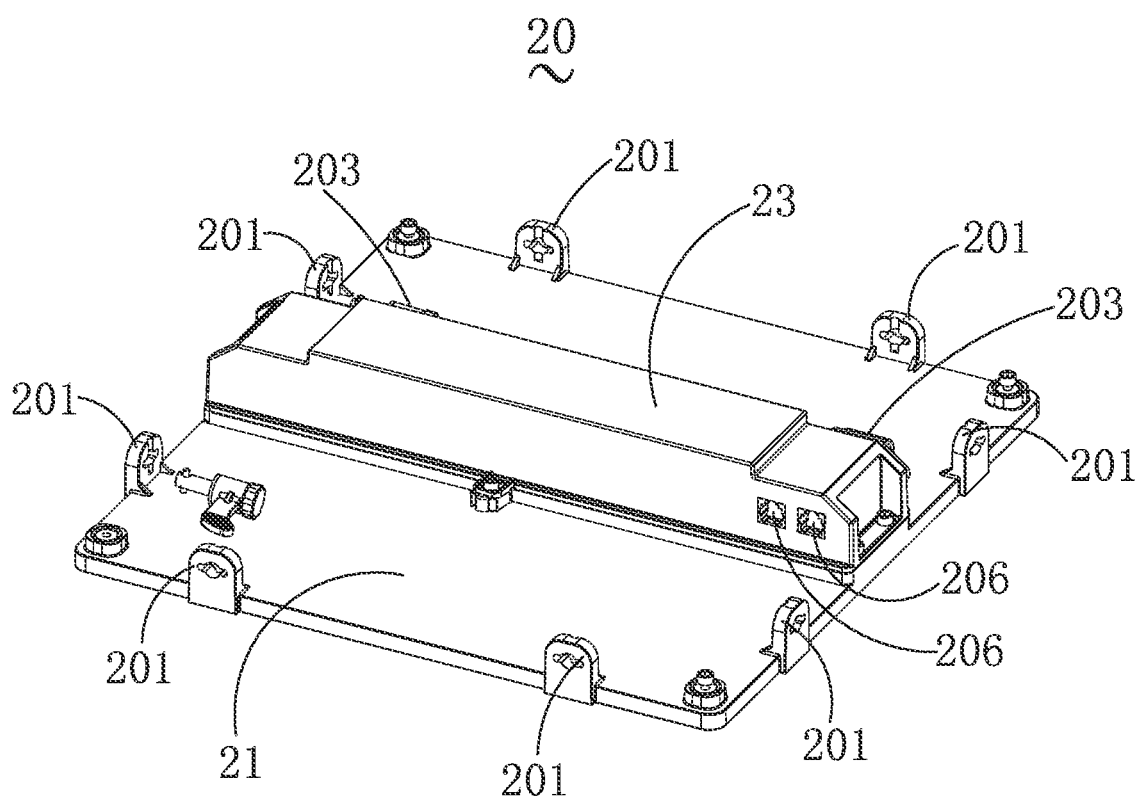
FIG. 3 is a schematic view of the plant lamp of FIG. 1 from another angel.

Referring to FIG. 3, additionally, the power box 23 is further provided with a data line socket 206. The data line socket 206 is arranged at the power box 23 away from the power socket 203. One end of the data line socket 206 can be connected to a operate terminal, and the other end of the power socket 206 is connected to the wiring module 26 through the power box 23 to achieve wired control of the plant lamp 20.

Optionally, the data line socket 206 can be one of a RJ12 port, a RJ14 port, a RJ45 port, a USB port, a Micro USB port, a Type-C port, or a Lighting port. No limitation can be made in the embodiment of the present disclosure.

In detail, the plant lamp 20 can be provided with two data line sockets 206. When two or more plant lamps 20 being assembled together, the two or more plant lamps 20 can be connected by interconnecting corresponding data line sockets 206 of each two adjacent plant lamps 20 with a data line to form a unified controllable data network. Therefore, unified control of assembled plant lamps 20 can be achieved.

Figure 4:
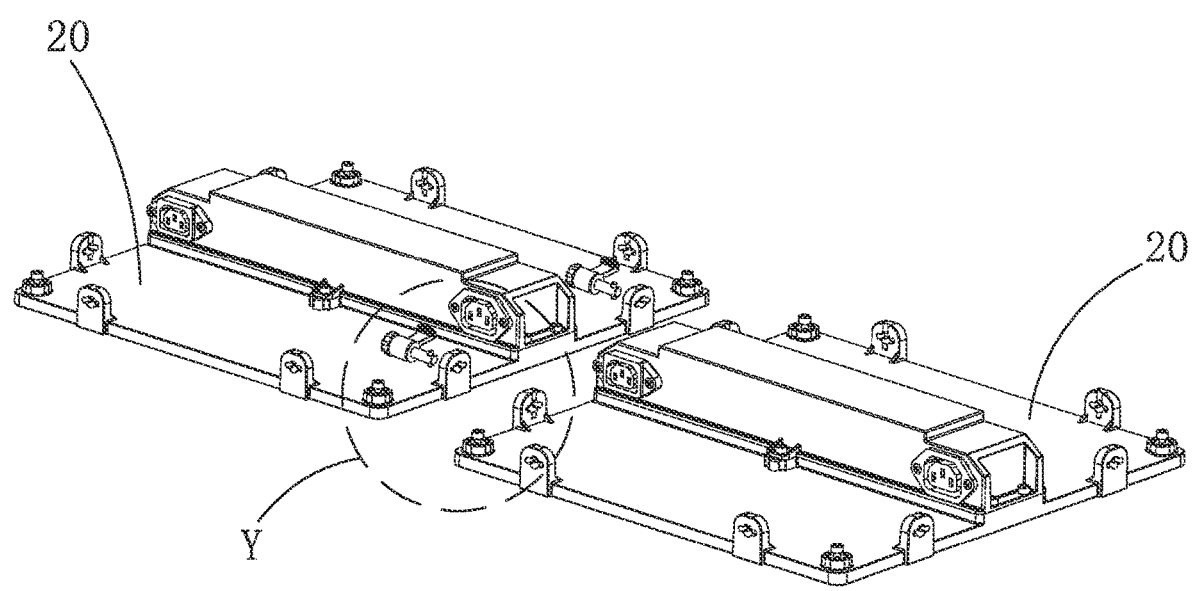
FIG. 4 is a schematic view of two plant lamps of FIG. 1 assembled together.
Figure 5:
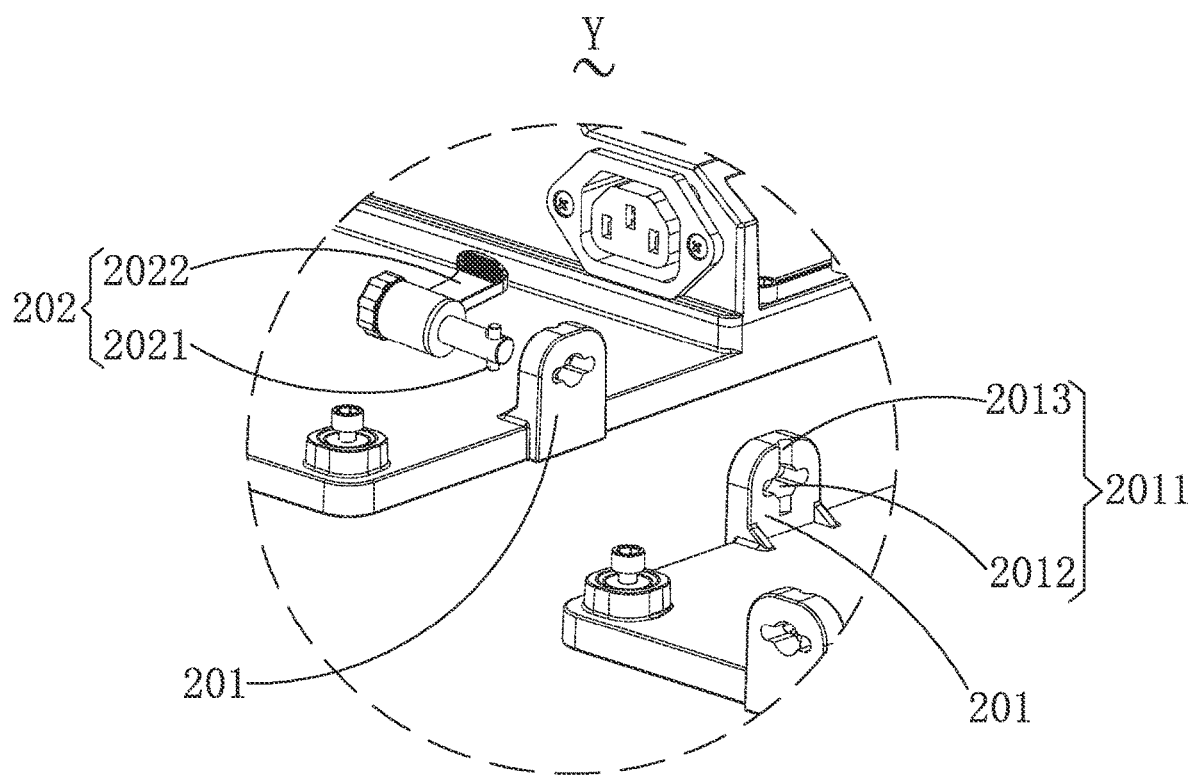
FIG. 5 is an enlarged view of a portion Y shown in FIG. 4.

Referring to FIGS. 4 and 5, when two plant lamps 20 being assembled, the fixing seats of the two plant lamps 20 close to each other. Additionally, the slot 2011 defined on the fixing seat 201 includes a through hole 2012 and a groove 2013. A side of the fixing seat 201 configured to be connected to another plant lamp 20 is taken as an outer side, and a side away from the outer side is taken as an inner side. The through hole 2012 runs through the outer side and the inner side of the fixing seat 201. The groove 2013 is defined at the inner side. The groove 2013 extends from a center of the through hole 2012 along two opposite directions. The direction along which the groove 2013 extends is perpendicular to a direction along which a long side of the through hole 2012 extends. The fixing seat 201 is provided with a quick lock 202. One end of the quick lock 201 is provided with an axis pin 2021, and the other end of the quick lock 201 is provided with a hand board 2022. When two plant lamps 20 are to be assembled, the axis pin 2021 passes through the through holes 2012 of the two plant lamps 20 in turn and then rotates 90 degrees to be engaged into the groove 2013 of a latter one of the two plant lamps 20. At this time, the two plant lamps 20 can be locked together by pulling the hand board 2022.

Figure 6:
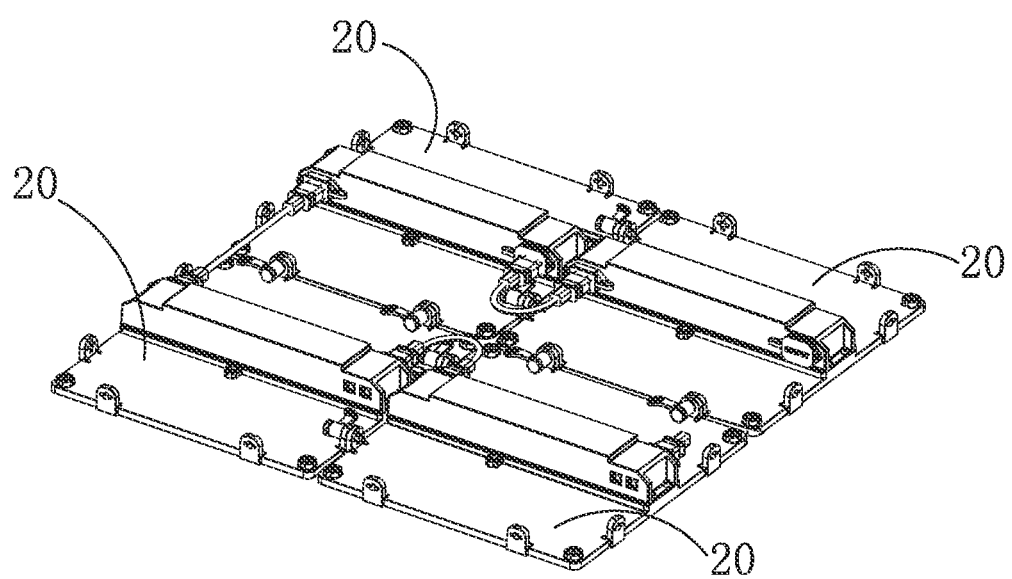
FIG. 6 is a schematic view of four plant lamps of FIG. 4 assembled together.

Referring to FIG. 6, when using the plant lamps 20 of the present disclosure, a user can assemble desired number of plant lamps together according to actual requirements, such as three plant lamps, four plant lamps (shown FIG. 6), six plant lamps, eight plant lamps and so on.

Figure 7:
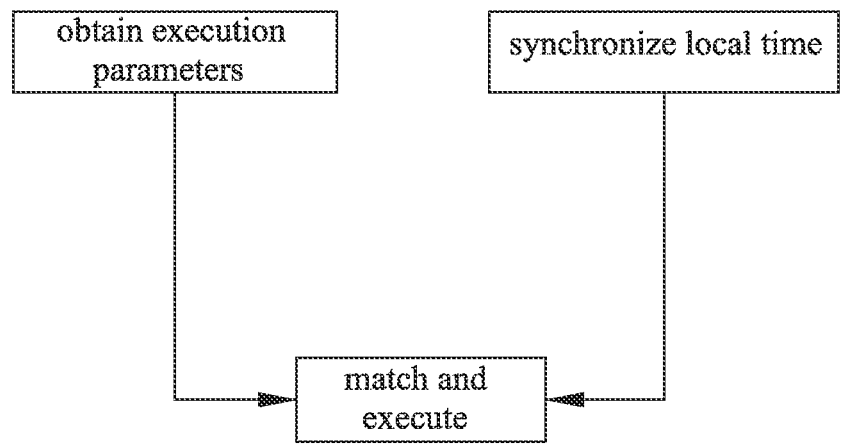
FIG. 7 is a flow chart of a control method according to a second embodiment of the present disclosure.

Referring to FIG. 7, a second embodiment of the present disclosure provides a control method of the plant lamp configured to control at least two assembled plant lamps illustrated in the first embodiment, electrical connections between power sockets of each two adjacent plant lamps, and communication between wiring modules of each two adjacent plant lamps. The control method includes the following steps:

Obtain execution parameters: the wiring module of each plant lamp obtain execution parameters including phases of plant growth, execute period of each day within each phase, and corresponding illumination intensity within each execute period;

Synchronize local time: obtain current time of a zone where the user is located.

Match and execute: match the local time to corresponding execute period, and control the plant lamp to emit light according to corresponding illumination intensity of the corresponding execute period.

It should be understood that, based on local time, each point from local sunrise to sunset can be accurately reflected. The time from sunrise to sunset can be divided precisely into different execute periods. Therefore, different execute periods can reflect different time period of a day in the local zone, and illumination intensity of each execute period can be determined according to the local sunlight intensity of corresponding time period. Therefore, the illumination intensity of the plant lamps can be changed to simulate local sunlight, thus making plants to growth according to the natural law of the local natural light. It solves the problem that existing plant lamps cannot be adjusted and the plants cannot grow normally. Furthermore, synchronization local time can break regional limitation, especially in current globalized market, the present disclosure can make the plant lamp in different countries and different regions accurately match local time to emit light, greatly improving the practicability and convenience of the plant lamp.

It should be understood that, the phrase can be a long period including a plurality of days. Each day within the long period can be a short period including a plurality of execute periods. When all execute periods is finished, the short period is finished. At this time, the number of finished days is increased by one, and then all execute periods of the next day are continued. In this way, the number of finished days is successively accumulated until all days within the long period are finished, and the phase is completed. If there is one or more other phases following the phase, all execute period of a next phase will successively be performed. In this way, a planting process finished until all phases included in the planting process are completed.

Optionally, the phrases of plant growth can include at least one of a germination stage, a seeding stage, a growth stage, a flowering stage or a fruiting period. Definitely, a user can define other phrases according to actual requirements and no limitation will be made in present disclosure. It should be understood that, plants need different illuminating time corresponding to different phases. By setting different phases, illuminating time and illuminating intensity of each execute period within each day within each phase can be changed. The execute periods within each day can be repeatedly performed, therefore, light illumination on the plants in different phases can be precisely controlled and the light illumination effect is further improved.

It should be understood that, a maximum luminous power of the plant lamp is a constant value, and the maximum luminous power corresponds to a maximum illumination intensity. That is, the maximum illumination intensity of the plant lamp is a constant value. In an embodiment, the maximum illumination intensity can be defined as 1, then according to percentages of the maximum illumination intensity to determine illumination intensity in each execute period. That is, the illumination intensity in each execute period can be any value of 0-100%, wherein, 0 represents the plant lamp does not work, 100% represents the plant lamp works with the maximum illumination intensity.

In an embodiment, the execute periods can be determined by dividing 24 hours within a day, and all execute periods can be repeatedly performed within a phase. It should be understood that, each execute period can be circularly performed once after each 24 hours. The number of days within the phase is the number of cycles. This method simplifies controlling calculations. Dimming process can be smoothly executed without interruption or overlap of execute periods, dimming effect is thus better.

Optionally, each execute period can be defined by two time points. For example, (am 6:00, am 8:00) represents the execute period is from am 6:00 to am 8:00. In order to avoid overlap of time periods, each execute period can be predetermined to include either the earlier time point or the latter time point. For example, two adjacent execute periods (am 6:00, am 8:00) and (am 8:00, am 10:00), if each execute period is predetermined to include only the earlier time point, am 8:00 belongs to the execute period (am 8:00, am 10:00); if each execute period is predetermined to include only the latter time point, am 8:00 belongs to the execute period (am 6:00, am 8:00). Alternatively, the execute periods can be determined by a time point and a duration time. For example, (am 6:00, 120 min) represents the execute period starts at am 6:00 and lasts for 120 minutes.

It should be understood that, current time synchronized with a user's zone is a specific time point which will correspond to an execute period, the plant lamp will be controlled to emit light with an illumination intensity corresponding to the execute period. For example, if the current time synchronized with the user's zone is am 7:00 with falls into the execute period (am t:00, am 8:00) or the execute period (am 6:00, 120 min), the plant lamp will be controlled to emit with an illumination intensity corresponding to the execute period (am t:00, am 8:00) or be execute period (am 6:00, 120 min).

It should be understood that, there will be a case where the current time of the user's time zone is initially synchronized, and the initial current time may fall into the latter half of the initial day, then the total illumination duration of the initial day may be very short. Since the phase is calculated by days, if the initial day is included in the phase, the total illuminating duration of the phase will be insufficient. Whether the initial day is included in the phase depends on whether the initial time is before or after 12:00 noon. If the initial current time is before 12:00 noon, the initial day will be included in the phase, that is, the number of finished days will be increased by one after end of the initial day; If the initial current time is after 12 noon, the initial day will be not included in the phase, that is, the number of finished days will be not increased after the end of the initial day, but accumulated from a next day.

Optionally, the execution parameters can be obtained in a wired or wireless way.

If the execution parameters are obtained in a wired way, in an embodiment, the power box of the plant lamp can be provided with at least one data line socket configured to connect an operate terminal. The data line socket is connected to the wiring module through the power box, therefore, the wiring module can be connected to the operate terminal through the data line socket. Each plant lamp can be provided with two data line sockets. When a plurality of plant lamps are assembled together, one of the two data line sockets of a plant lamp can be connected to the operate terminal, and the other one of the two data line sockets of the plant lamp can be connected to a data line socket of an adjacent plant lamp with a data line. The plurality of plant lamps can be connected in turn by interconnecting the data line sockets of each two adjacent plant lamps so as to achieve communication and uniform control of the plurality of plant lamps. The data line sockets can be can be one of a RJ12 port, a RJ14 port, a RJ45 port, a USB port, a Micro USB port, a Type-C port, or a Lightning port. In an application of this way, the operate terminal can be arranged at a fixed position. For example, in greenhouse planting, the operate terminal can be set on a wall at an entrance of the greenhouse. The operate terminal can be connected to the plant lamp with data lines. The operate terminal can be a computer, a control screen and or the like.

If the execution parameters are obtained in a wireless way, the wiring module can be provided with a communication module configured to receive wireless control signal from an operate terminal. At this circumstance, the operate terminal can be a mobile phone application, or a remote control. The wireless control signal can be WIFI signal Bluetooth® signal, NFC signal, or Zigbee signal. In an alternative embodiment, the plant lamp can be provided with a wired communication function and a wireless communication function, which allows a user to set execution parameters in either wire way or wireless way according to different application environments. Such arrangement can make the plant lamp suitable for different application environments, which is more practical. For example, the execution parameters can be set in a wired way in an environment with weak wireless signal.

Figure 8:
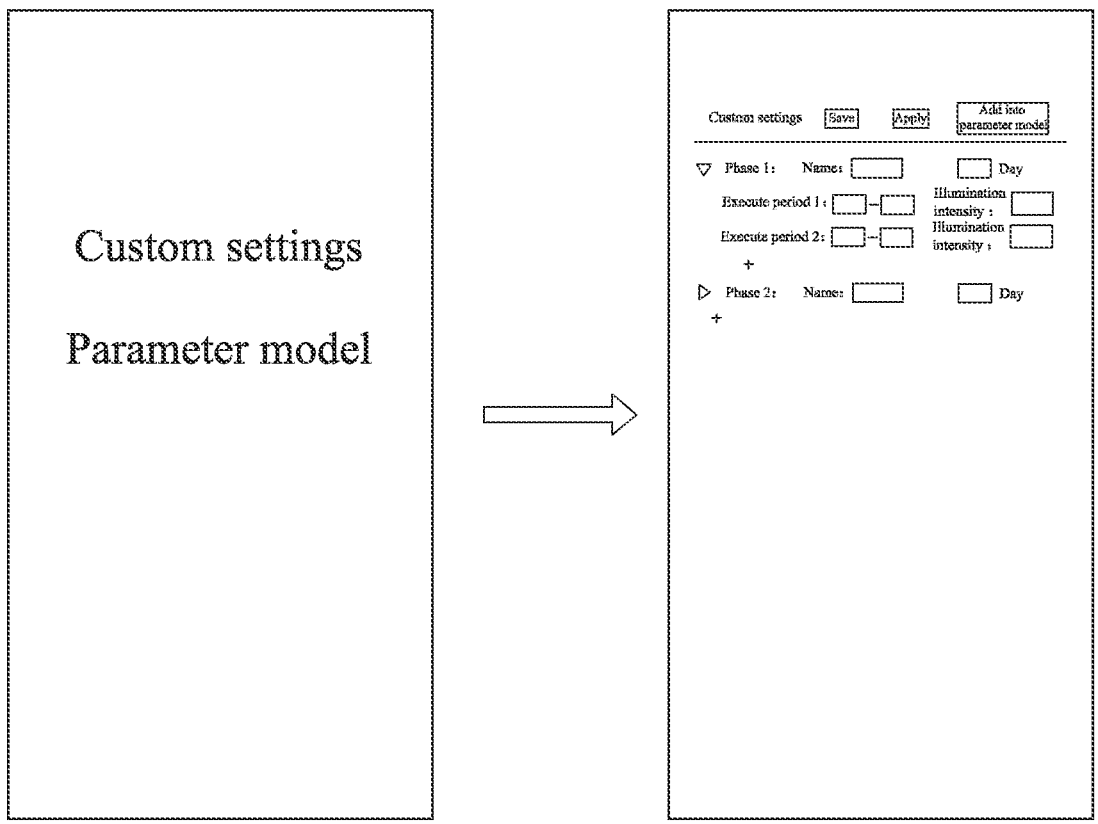
FIG. 8 shows an exemplary interface for customizing execution parameters in the control method of the second embodiment.
Figure 9:
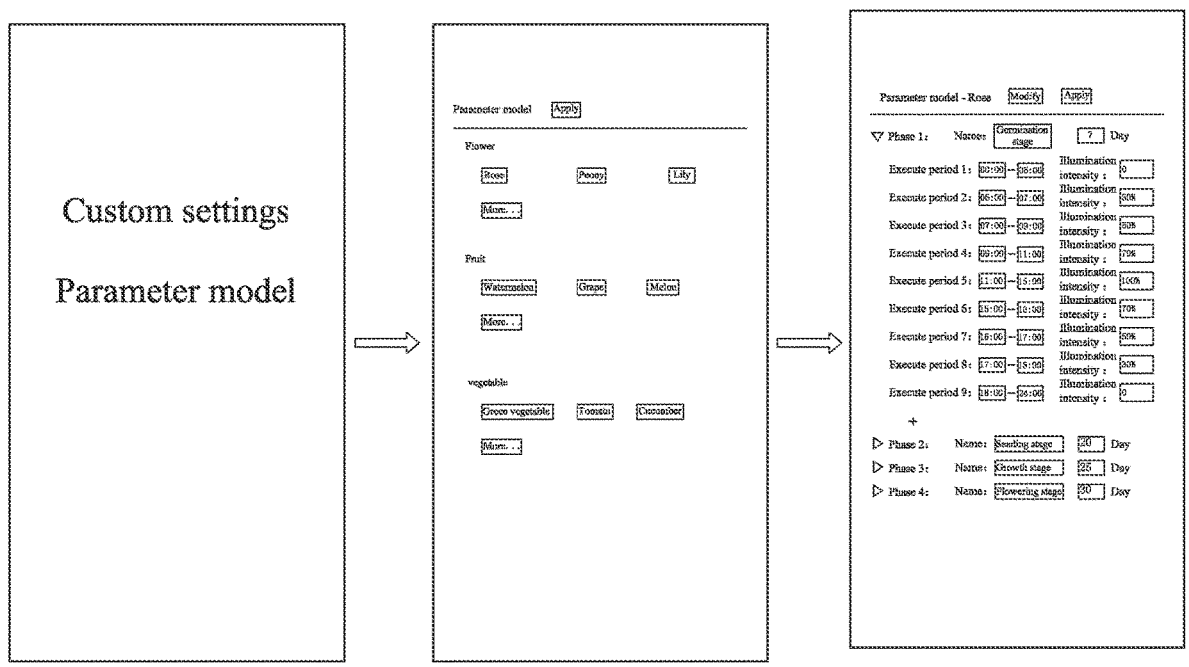
FIG. 9 shows an exemplary interface for calling a parameter mode in the control method of the second embodiment.
Figure 10:
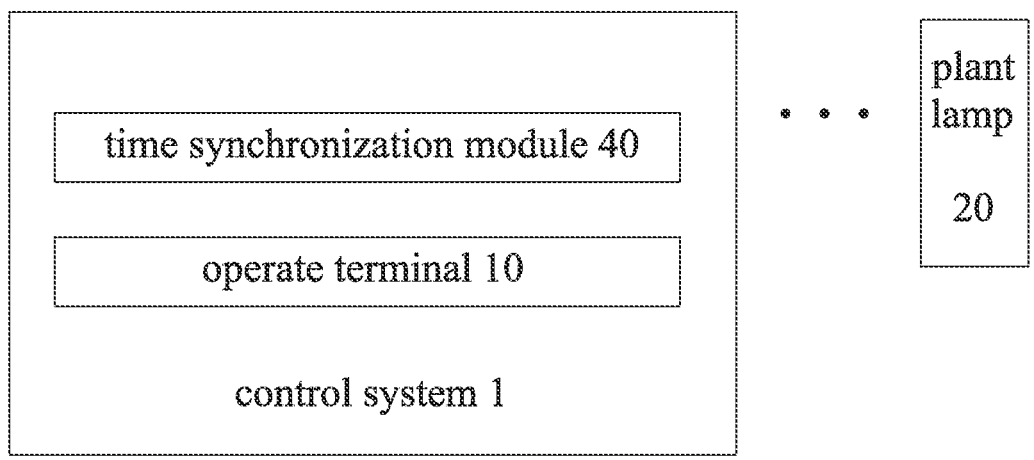
FIG. 10 is a schematic view of functional modules of a control system according to a third embodiment of the present disclosure.

Referring to FIGS. 8 and 9, optionally, the execution parameters can be customized by a user or call a predetermined parameter model. If a user wants to customize the execution parameters, in an embodiment, referring to FIG. 8, the user can define which phases can be included in a planting process, the number of days included in each phase, execute periods included in each day, and illumination intensity in each execute period successively. It should be understood that, the operate terminal can display a user interface. The user interface can illustrate input field of each execution parameter, and the user can set the execution parameters according to screen tips. Referring to FIG. 9, in an embodiment, a user can call a predetermined parameter model. The predetermined parameter model can be named as a name of the plant. The user can call the predetermined parameter model by the name of the plant. The predetermined parameter model can include phases in a planting process, execute periods in each phase, and illumination intensity in each execute period. Either by customizing the execution parameters or calling the predetermined parameter model, the plant lamp can obtain the execution parameters accurately. By customizing the execution parameters, a user can set execution parameters for special plants according to his own planting experiences. By calling the predetermined parameter model, the user can quickly control the plant lamp. Such arrangement allows the user to select either customizing the execution parameters or calling the predetermined parameters according to actual requirements, which greatly increase convenience and practicality.

It should be understood that, in an embodiment of the present disclosure, the control method can control a plurality of plant lamps synchronically, and the plurality of plant lamps can obtain the execution parameters synchronically.

In an alternative embodiment, a plurality of plant lamps can be set different execution parameters. When the current time is synchronized to the time in the user's zone, each plant lamp can obtain corresponding execution parameter, therefore achieving uniform control of the plurality of plant lamp. It should be understood that, in this way, the number of plant lamps which is lighted on at a specific time can be controlled, therefore, illumination intensity of the plant lamps can be controlled more precisely. For example, at a specific time Tx which falls into an execute period $(T_a, T_{a+1})$ of a plant lamp A, an execute period $(T_b, T_{b+1})$ of a plant lamp B, and an execute period $(T_c, T_{c+1})$ of a plant lamp C, if an illumination intensity in the execute period $(T_a, T_{a+1})$ is 30%, an illumination intensity in the execute period $(T_b, T_{b+1})$ is 30%, an illumination intensity in the execute period $(T_c, T_{c+1})$ is 0, the plant lamp A and the plant lamp B will be lighted on while the plant lamp C is closed at the time Tx. At this time, the illumination intensity of assembled plant lamps (A+B+C) is the sum of the illumination intensity of the plant lamp A and the illumination intensity of the plant lamp B.

In an embodiment, a plurality of plant lamps assembled together can be divided into a plurality of groups and the plant lamps in each group can be set same execution parameters. That is, the plant lamps in a same group will emit light based on the same execution parameter, being turned on, turned off or changing illumination intensity simultaneously. When the current time is synchronized with the time in the user's zone, the plant lamps in each group can match the current time into corresponding execute period and obtain and execute corresponding execution parameters so as to achieve uniform control of the plurality of groups plant lamps. It should be understood that, the plant lamps can be divided into groups according to illumination range, therefore, a plurality of illumination ranges can be uniformly controlled by grouping. The plant lamps can be divided into groups according to specification of each plant lamp so as to achieve switching light, or the plant lamps can be divided into groups according to light color of each plant lamp so as to achieve different spectral combination and switching to meet needs of different plants at different time periods.

In an embodiment, a plurality of plant lamps can be detachably assembled and electrically connected and can be controlled to emit light according to the same execution parameters. That is, the plurality of plant lamps can be physically assembled together, uniform controlled by electrical connection and control signals, therefore, the illumination intensity within a predetermined range can be uniformly controlled. When the predetermined range is used for planting same plants, it will not happen that there will be light in part of the predetermined range but no light in other part of the predetermined range, or strong light in one part but weak light in other part, so that the plant growth will be uniform in the whole predetermined range.

Referring to FIGS. 1-3 and 10, a third embodiment of the present disclosure provides a control system 1 of the plant lamp configured to control at least two assembled plant lamps illustrated in the first embodiment, electrical connections between power sockets of each two adjacent plant lamps, and communication between wiring modules of each two adjacent plant lamps. The control system 1 includes operate terminal 10 and a time synchronization module 40.

The operate terminal 10 is configured to set execution parameters for plant lamps 20. The execution parameters include phases included in a planting process, execute periods in each phase and illumination intensity in each execute period.

The time synchronization module 40 is configured to synchronize the current time with the time in user's zone and feed the current time to the operate terminal 10.

The operate terminal 10 receives the current time from the time synchronization module 40 and matches the current time with corresponding execute periods so as to control the plant lamps 20 to emit light according to illumination intensity corresponding to the corresponding execute periods.

Additionally, the operate terminal 10 includes a parameter setting module configured to provide execution parameters. The plant lamps 20 are controlled to emit tight according to the execution parameters. The execution parameters include phases included in a planting process, execute periods in each phase and illumination intensity in each execute period. That is, the execution parameters can be circularly performed. The plant lamps 20 is controlled to emit light circularly in a predetermined phase so as to achieve smart control of the plant lamps. Furthermore, the execute periods can simulate a process from sunrise to sunset, which make the light emitted by the plant lamps simulate nature sunlight and make light illumination better.

Additionally, the parameter setting module further include a customized setting sub-module and a parameter model calling module. The customized setting sub-module is configured to set execution parameters. The parameter model calling module is configured to call a predetermined parameter model that can be invoked with a single key.

Figure 11:
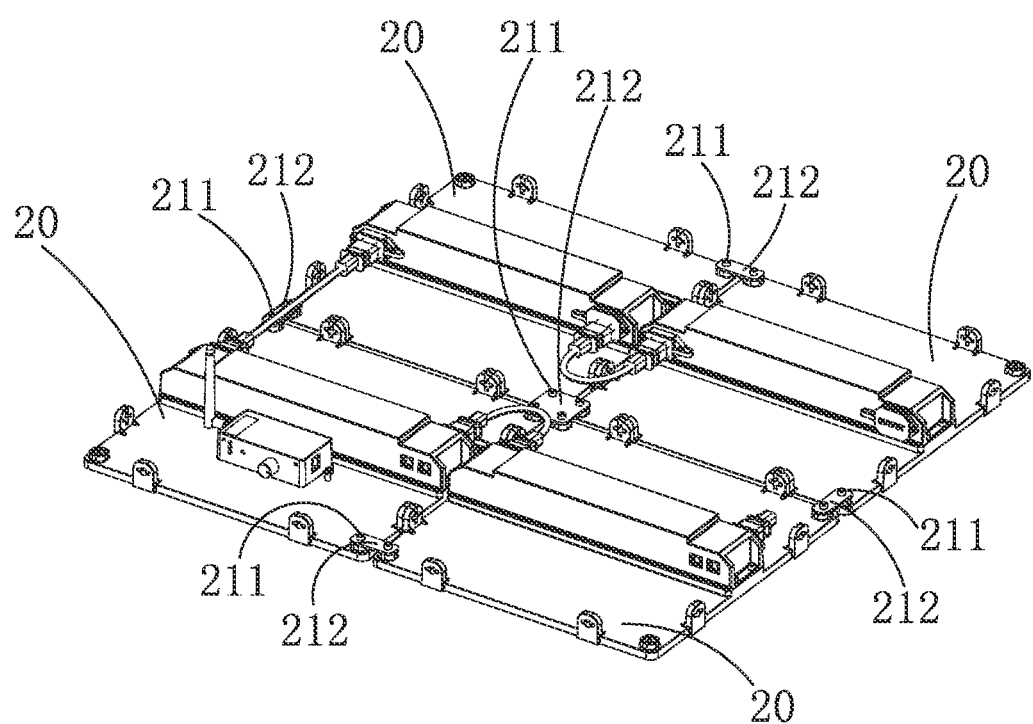
FIG. 11 is a schematic view of a plurality of plant lamps of the control system of the third embodiment assembled together with bolts.
Figure 12:
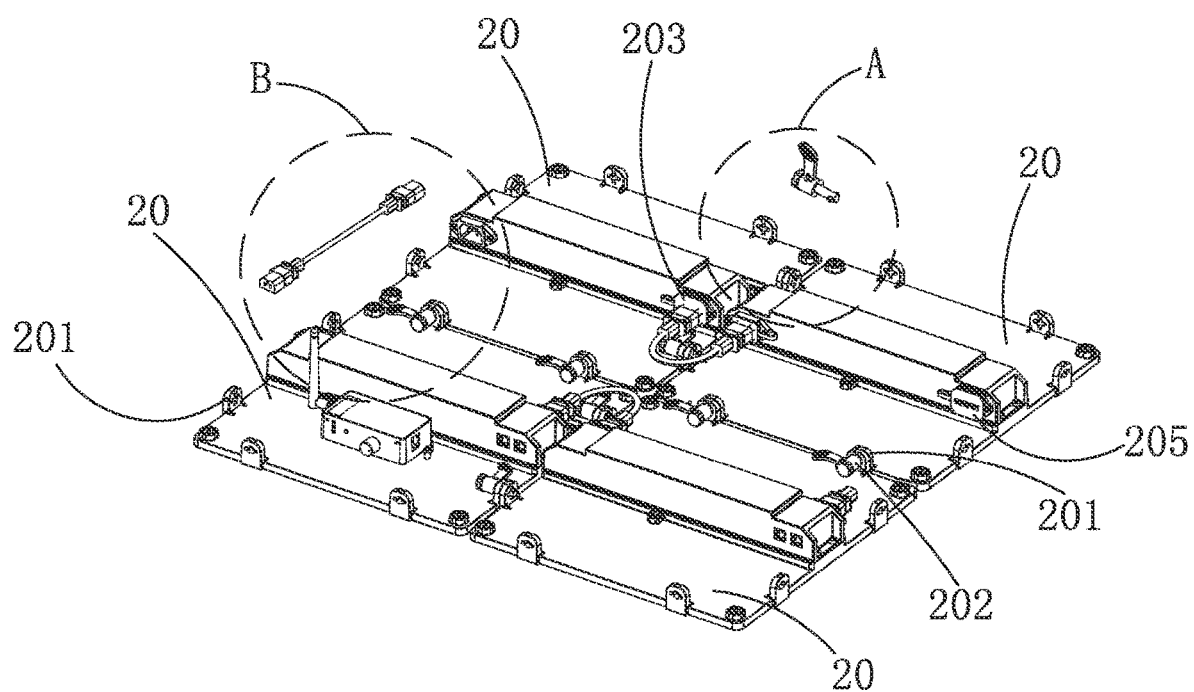
FIG. 12 is a schematic view of a plurality of plant lamps of the control system of the third embodiment assembled together with quick locks.

Referring to FIGS. 11 and 12, optionally, the plant lamps 20 can be detachably assembled together with quick locks or bolts.

In an embodiment, the plant lamps 20 are assembled with bolts 211 and connecting pieces 212 (referring to FIG. 11).

In an embodiment, the plant lamps 20 are assembled with quick locks 202, the quick lock 202 engages with the fixing seats 201 to assemble the plant lams together (referring to FIG. 12).

In detail, in the embodiment of the present disclosure, the plant lamps 20 are detachably assembled together with quick locks.

It should be understood that, the operate terminals 10 provides execution parameters to each plant lamp 20 simultaneously. Through the fixing seats 201 and the quick locks 202 the plant lamps are detachably assembled together, which facilitate increasing or decreasing illumination area by increasing or decreasing the number of the plant lamps 20 assembled so as to meet requirements of different planting environments. All the plant lamps 20 are electrically connected, which facilitate uniform control of power on/off. All the plant lamps 20 are connected by communication in turn, which allows the operate terminal 10 to uniformly control the plant lamps to emit light and the illumination intensity of the plant lamps can be uniformly controlled. In large scale planting, the operate terminal 10 can set execution parameters to achieve uniform control of the number of plant lamps lighted on and illumination intensity of each plant lamp. Therefore, the control system 1 of the present disclosure can achieve uniform control of electrical connection and communication connection and can solve the problem that existing plant lamps cannot be assembled together and cannot be uniformly controlled. Furthermore, assembling or disassembly of the plant lamps facilitate miniaturization and standardization of a single plant lamp 20 and is convenient for transportation and assembling. Cost for transportation and assembling can be thus decreased. Assembled plant lamps can function as an integrally formed lamp and does not affect large scale planting. Furthermore, in an initial planting stage, a user can choose the number of plant lamps 20 to be purchased according to an initial planting area to save initial cost. In the later stage, if the planting area needs to be enlarged, the user can purchase the same plant lamps 20 for assembly. If the user wants to decrease the planting area, the user can also remove corresponding number of plant lamps 20 at any time to save power. Thus, the plant lamp 20 can reduce cost for the user and improve user experiences.

Figure 13:
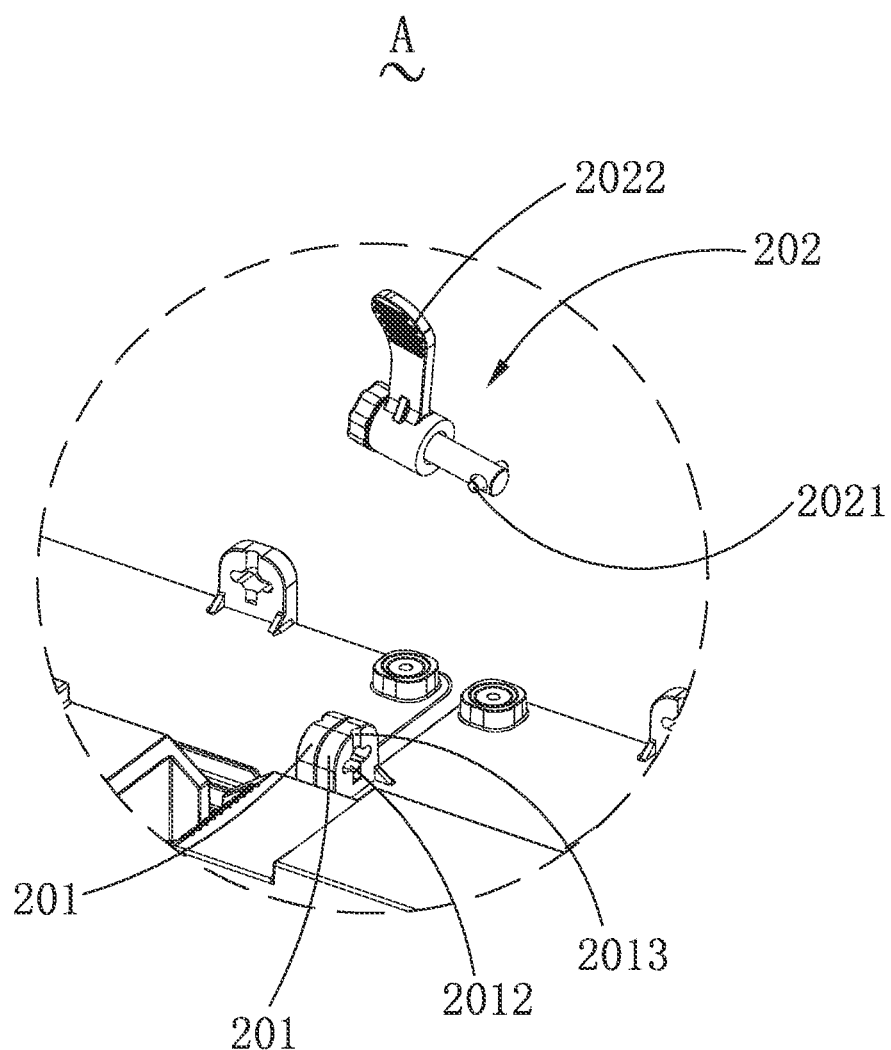
FIG. 13 is an enlarged view of a portion A shown in FIG. 12.

Referring to FIGS. 2 and 12-13, additionally, four sides of the plant lamps 20 are provided with a fixing seat 201. When two plant lamps 20 are to be assembled, the fixing seats 201 of the two plant lamps 20 close to each other. The fixing seat 201 defines a through hole 2012 and a groove 2013. The groove 2013 is defined at a side of the fixing seat 201 away from a joint of the two plant lamps 20. The groove 2013 extends from a center of the through hole 2012 in two opposite directions. The direction along which the groove 2013 extends is perpendicular to a direction along which a long side of the through hole 2012 extends. The fixing seat 201 is provided with a quick lock 202. One end of the quick lock 201 is provided with an axis pin 2021, and the other end of the quick lock 201 is provided with a hand board 2022. When two plant lamps 20 are to be assembled, the axis pin 2021 passes through the through holes 2012 of the two plant lamps 20 in turn and then rotates 90 degrees to be engaged into the groove 2013 of a latter one of the two plant lamps 20. At this time, the two plant lamps 20 can be locked together by pulling the hand board 2022.

Figure 14:
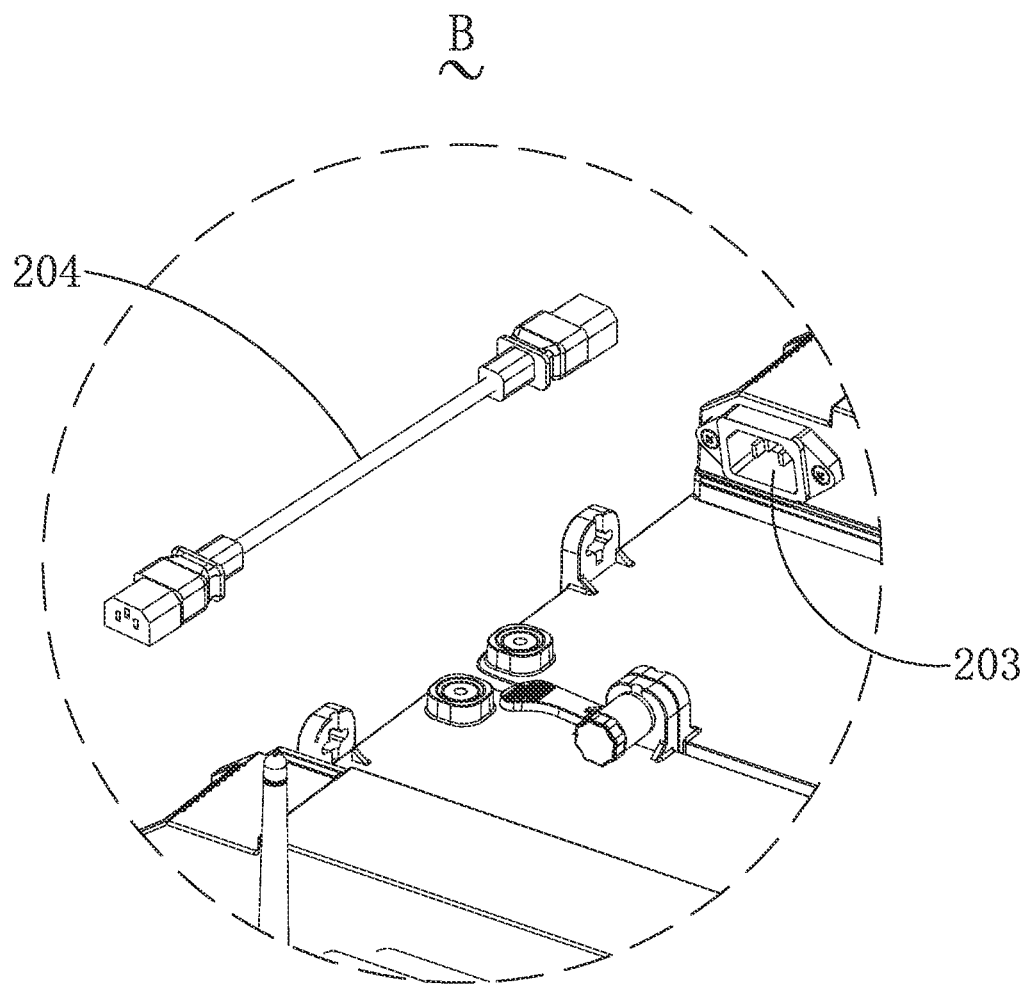
FIG. 14 is an enlarged view of a portion B shown in FIG. 12.

Referring to FIGS. 12 and 14, additionally, each plant lamp 20 is provided with two power sockets 203. The power sockets 203 can be arranged at any suitable position on the plant lamp 20 to ensure that it can be connected with the internal circuit of the plant lamp 20. Connecting lines 204 corresponds to the power socket 203. When the plant lamps 20 are assembled together, the connecting lines 204 can connect two power socket 203 of adjacent two plant lamps 20 to electrically interconnecting the adjacent two plant lamps 20.

Additionally, each power socket 203 corresponds to an electrical plug 205. It should be understood that, one of the two power sockets 203 of the last plant lamp in an assembled plant lamps can be covered by the electrical plug 205 so as to form an electrical circuit, thus making the control system in a complete electrical circuit.

Optionally, the operate terminal 10 can provide execution parameters to the wiring module 26 of each plant lamp in a wired or wireless way so as to uniformly control the plant lamps 20.

Figure 15:
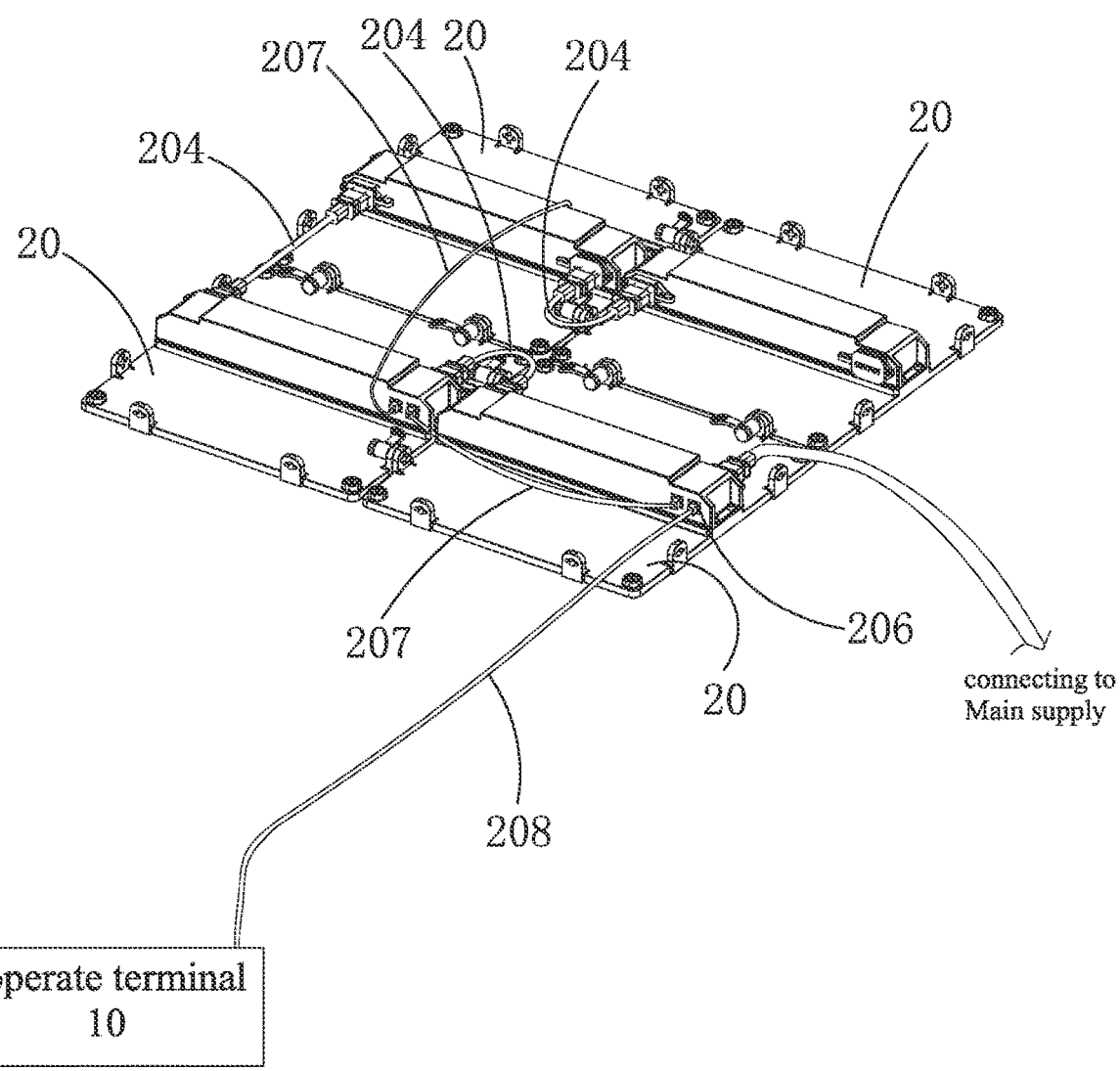
FIG. 15 is an exemplary application of the control system of the third embodiment connected in a wired way.

Referring to FIGS. 2 and 15, the execution parameters are obtained in a wired way, in an embodiment, the plant lamp 20 can be provided with two data line sockets 206. The data line socket 206 can be arranged on any suitable position on the plant lamp 20 to ensure that it can be connected with the wiring module 26 of the plant lamp 20. Data lines 207 corresponds to the data line sockets 206. The plant lamps are connected in turn with the data lines 207. When a plurality of plant lamps are assembled together, one of the two data line sockets 206 of a plant lamp is connected to the operate terminal 10 with an external data line 208. It should be understood that, the plurality of plant lamps are connected to form a data network with a plurality of data lines 207. The operate terminal 10 can control the data network through the external data line 208 so as to uniformly control each plant lamp 20.

Optionally, the data line sockets can be can be one of a RJ12 port, a RJ14 port, a RJ45 port, a USB port, a Micro USB port, a Type-C port, or a Lighting port, and no limitation is made in present disclosure. A plug of the data line 207 matches with the data line socket 206.

In an application of this way, the operate terminal 10 can be arranged at a fixed position. For example, in greenhouse planting, the operate terminal 10 can be arranged on a wall at an entrance of the greenhouse or in a specific controlling room. The operate terminal 10 can be a computer, a control screen and or the like. A screen of the operate terminal 10 can display illumination state of each plant lamp and/or execution of the execution parameters.

Figure 16:
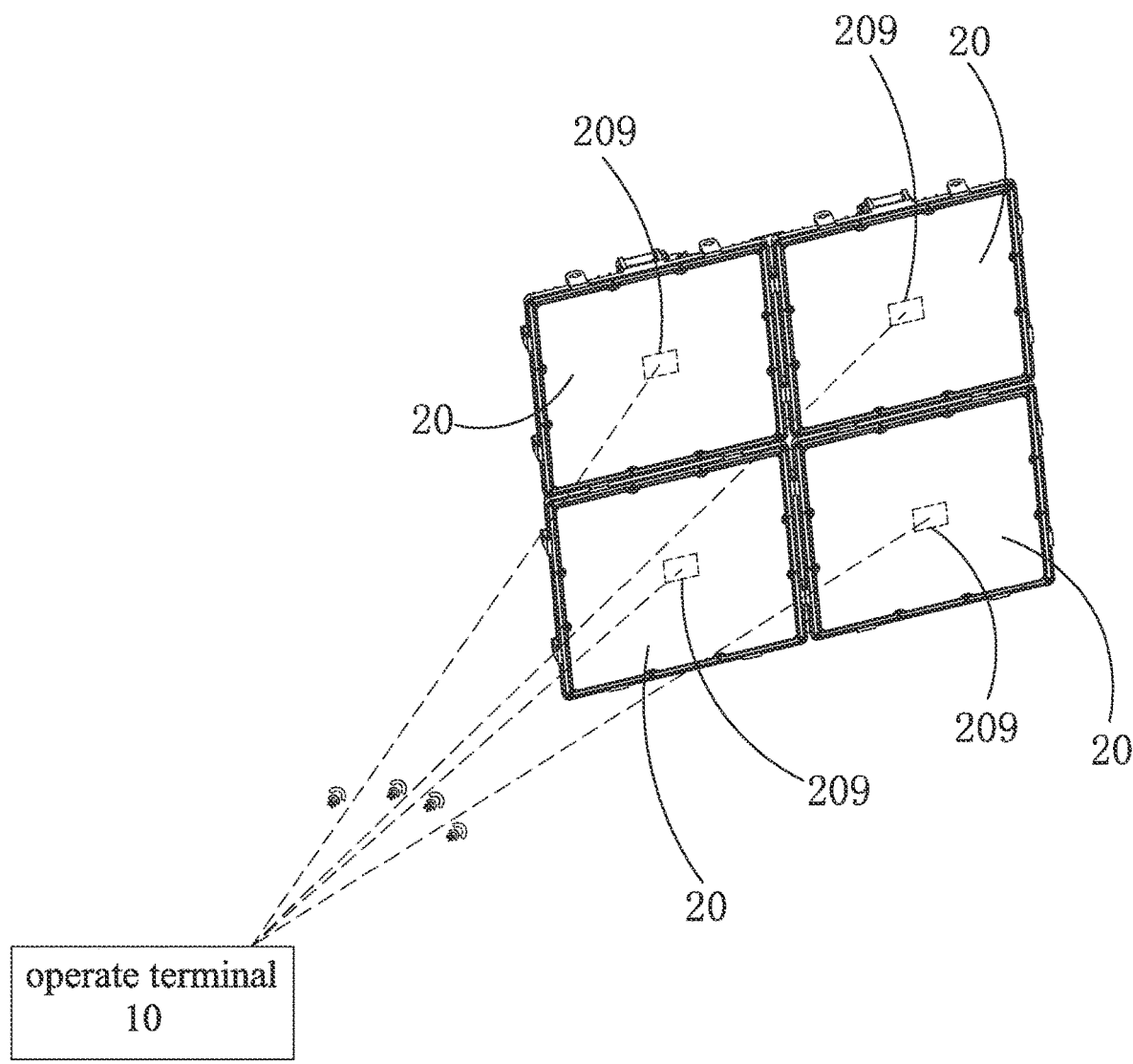
FIG. 16 shows a first exemplary application of the control system of the third embodiment connected in a wireless way.

Referring to FIGS. 2 and 16, in an embodiment, the execution parameters are obtained in a wireless way, the wiring module of each plant lamp 20 can be provided with a communication module 209. It should be understood that, the communication module 2098 can generate an Internet protocol address (that is, IP node). Each plant lamp 20 is connected to the operate terminal 10 by the IP node so as to receive control signals from the operate terminal 10. The operate terminal 10 can be a mobile phone application, or a remote control. The wireless control signal can be WIFI signal, Bluetooth® signal, NFC signal, or Zigbee signal. In this way, the operate terminal 10 can uniformly control the plant lamps 20 in a wireless way.

Figure 17:
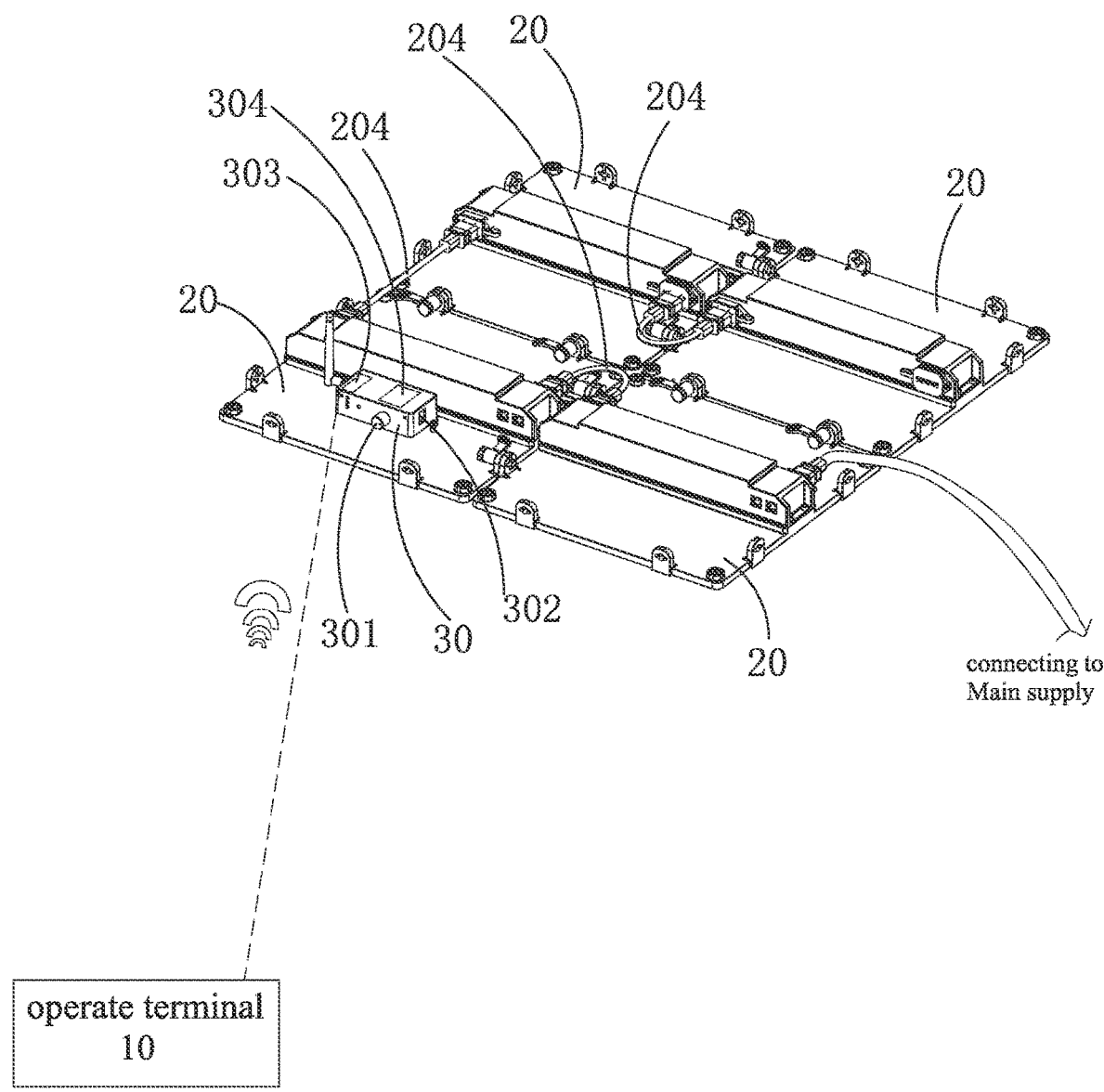
FIG. 17 shows a second exemplary application of the control system of the third embodiment connected in a wireless way.

Referring to FIG. 17, in an embodiment, the execution parameters are obtained in a wireless way, the control system 1 further includes a control box 30. The control box 30 can be arranged at any position on the plant lamp to ensure it can be electrically connected with the any one of the plant lamps 20. In detail, the control box 30 can be arranged on a back side of one of the plant lamps 20, which facilitate wiring and connection. The control box 30 is configured to be electrically connected to any one of the plant lamps 20 and to generate a uniform IP node. The control box 30 is connected to the operate terminal 10 by the uniform IP node, and the operate terminal 10 controls the plant lamps 20 through the control box 30. It should be understood that, the control box 30 can be provided with a wireless receiver inside configured to receive wireless signals from the operate terminals 10. It should be understood that, when the operate terminal 10 is directly connected with the communication module of each plant lamp 20, and the number of the plant lamps is too large, the operation terminal 10 needs to match a large number of IP nodes to each plant lamp. At this time, each plant lamp are controlled by the operate terminal 10 to emit light, which is easy to cause network congestion and delay. By setting the control box 30, only one uniform IP node is needed to be matched to the control box 30, since the plant lamp 20 forms a wired network through the connecting lines 204, the control box 30 only needs to be electrically connected to the wired network to uniformly control the plant lamps 20 assembled together. That is, only one uniform IP node is needed to achieve uniform control of the plant lamps, which can effectively avoid network congestion and delay and especially suitable for large scale planting and a large number of plant lamps assembled together.

Additionally, in an alternatively embodiment, the control box 30 can be provided with control button 301, input port 302 and wireless receiving device 303. The control button 301 can be configured to allow a user to operate to adjust illumination state. The input port 302 is configured to be connected to the operate terminal 10 in a wired way. The wireless receiving device 303 can be connected wirelessly to the operate terminal 10. A user can select either wired way or wireless way according to actual requirements to control illumination state. Such arrangement makes the plant lamps 20 suitable for different application environments. For example, in an environment with weak wireless signal, a user can adjust illumination state of the plant lamps by the control button 301, which is more practical. Above-mentioned three ways for adjusting illumination state can coexist, do not conflict with each other, do not interfere with each other.

Additionally, the control box 30 is provided with a single-chip module 304, which can receive and store the execution parameters. When the control box 30 is disconnected from the operate terminal 10, the control box 30 controls the plant lamps 20 to execute the execution parameters stored in the single-chip module 304. By setting the single-chip module 304, when the execution parameters of the operate terminal 10 cannot be obtained due to network interruption, the control box 30 can use the same execution parameters stored in the single-chip module 304 to continue to control the plant lamps 20 to emit light, so as to avoid abnormal growth of plants caused by illumination interruption.

A fourth embodiment of the present disclosure provides a computer readable medium configured to store computer programs. The computer programs are configured to be executed to perform the control method described in the first embodiment.

According to the embodiments of the present disclosure, the process described above may be implemented as a computer software program. For example, embodiments of the present disclosure include a computer program product that includes a computer program carried on a computer-readable medium. The computer program includes program codes for executing a method shown in a flow chart. In such an embodiment, the computer program may be downloaded and installed from the network through a communication section, and/or installed from a removable medium. When the computer program is executed by the central processing unit (CPU), the above functions defined in the control method of the present disclosure are executed. It should be noted that the computer-readable medium described in the present disclosure can be a computer-readable signal medium or a computer-readable storage medium or any combination of the two. Computer readable storage medium can include, but is not limited to, systems, devices or components including, but not limited to, electrical, magnetic, optical, electromagnetic, infrared, or semiconductor, or any combination of the above.

More detailed examples of computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the above. In the present disclosure, the computer-readable storage medium may be any tangible medium containing or storing a program, which may be used by or in combination with an instruction execution system, device or component. In the present disclosure, the computer-readable signal medium may include the data signal transmitted in the baseband or as part of the carrier wave, in which the computer-readable program code is carried. Such transmitted data signals may be in a variety of forms, including but not limited to electromagnetic signals, optical signals, or any suitable combination of the above. A computer-readable signal medium may also be any computer-readable medium other than a computer-readable storage medium, which may transmit, propagate or transmit a program for use by or in combination with an instruction execution system, device or component. The program codes contained on the computer-readable medium may be transmitted in any suitable medium, including but not limited to: wireless, wire, optical cable, RF, etc., or any suitable combination of the above.

The computer program codes for performing the operations of the present disclosure can be written in one or more programming languages or a combination thereof. The programming languages include object-oriented programming languages such as Java, Smalltalk, C++, and conventional procedural programming languages such as "C" or similar programming languages. The program codes can be completely executed on a user's computer, partially executed on the user's computer, executed as an independent software package, partially executed on the user's computer, partially executed on a remote computer, or completely executed on the remote computer or a server. In the case involving a remote computer, the remote computer may be connected to the user computer through any kind of networks, including a local area network (LAN) or a wide area network (WAN), or may be connected to an external computer (e.g., through the Internet using an Internet service provider).

Comparing with existing plant lamps, the plant lamps, the control method and the control system provided by the present disclosure have the following advantages:

The plant lamp provided of the present disclosure is provided with a fixing seat and a corresponding quick lock, which makes the plant lamp of the present disclosure not only can be used as a single lamp, but also can be assembled with plant lamps according to actual requirements. That is, illumination area can be increased or decreased by increasing or decreasing the number of the plant lamps assembled. Furthermore, assembling or disassembly of the plant lamps facilitate miniaturization and standardization of a single plant lamp 20 and is convenient for transportation and assembling. Cost for transportation and assembling can be thus decreased. Assembled plant lamps can function as an integrally formed lamp and does not affect large scale planting. Furthermore, in an initial planting stage, a user can choose the number of plant lamps 20 to be purchased according to an initial planting area to save initial cost. In the later stage, if the planting area needs to be enlarged, the user can purchase the same plant lamps 20 for assembly. If the user wants to decrease the planting area, the user can also remove corresponding number of plant lamps 20 at any time to save power. Thus, the plant lamp 20 can reduce cost for the user and improve user experiences.

The radiator member 21 of the present disclosure is a three-dimensional rectangle, which can make edges of assembled plant lamps flat, so that light intensity of the edges can be kept uniform. Furthermore, each side of the radiator member 21 is provided with at least two fixing seats 201 at interval, which can increase the number of fixing points, thus enhancing a connection between each two plant lamps 20.

The slot of the present disclosure includes a through hole and a groove, and is capable of matching with the quick lock so as to achieve quick assembly of the plant lamps. Furthermore, the groove can prevent the quick lock from sliding out of the slot, which greatly improve stability of the quick lock.

The power box of the present disclosure is provided with two power sockets. When two plant lamps are assembled together, the power sockets of the two power sockets can be connected with a conductive line so as to achieve a uniform electrical control of the two plant lamps. When more than two plant lamps are assembled together, any two adjacent plant lamps can be electrically connected with a conductive line so as to achieve a uniform electrical control of the more than two plant lamps.

The power box of the present disclosure is provided with two data line sockets. One of the two data line sockets can be connected to the operate terminal with a data line so as to achieve a wired control of the plant lamp. Furthermore, if a plurality of plant lamps are assembled together, any two adjacent plant lamps can be connected with a data line so as to form a uniform controllable data network, thus achieving uniform control of the plurality of plant lamps assembled together.

In the present disclosure, the data line socket is connected to the wiring module so as to achieve wired control of the plant lamp. Furthermore, through the communication module, a wireless control of the plant lamp is achieved.

In the present disclosure, the recess defined on the radiator member 21 is configured to receive the power box. During assembling or disassembling of the power box, components inside the power box can be limited in the recess, which prevents the components inside the power box from slipping and being gone.

In the present disclosure, the power box waterproof ring improves waterproof performance so as to avoid short circuit.

In the present disclosure, the light-transmitting board together with the lower surface of the radiator member forms an accommodating space for accommodating the PCB and the lamp beads, which can prevent dust from going into the accommodating space.

In the present disclosure, the board ring is arranged between the lower surface of the radiator member and the light-transmitting board, which can prevent moisture from going into the accommodating space to damage circuit on the PCB.

The control method of the present disclosure can synchronize the current time with the time in the user's zone, that is synchronization of local time. Illuminating intensity of the plant lamps can be determined by matching the current time with corresponding execute periods so as to achieve dimming of the plant lamps. It should be understood that, the current time can reflect accurately each time point from sunrise to sunset. Different execute periods can divide the process from sunrise to sunset of a day into multiple segments. Therefore, matching the current time with the execute periods can reflect each segment of local sunlight. Since each execute period corresponds to an corresponding illumination intensity, the illumination intensity of the plant lamps can be adjusted as time goes by. That is, the plant lamps can be adjusted to simulate sunlight to make planted plant can growth under the nature law of sunlight in the user's zone, which can resolve the problems that existing plant lamps cannot adjusted and plant cannot grow naturally. Furthermore, synchronization of local time can break regional limitation, especially in current globalized market, the present disclosure can make the plant lamp in different countries and different regions accurately match local time to emit light, greatly improving the practicability and convenience of the plant lamp.

The control method of the present disclosure, a user can customize execution parameters, and can set unconventional execution parameters according to his own planting experiences or special plants; or, the user can directly call a predetermined parameter model by one key. The predetermined parameter model can be prestored inside the system, or a model defined and stored by the user himself. The two ways for setting the execution parameters can be selected according to user's actual requirements, which improve convenience and practicability.

The control method of the present disclosure, the execute periods are determined by dividing 24 hours of a day. Each execute period is circularly performed once each 24 hours in a phase. That is, in a phase, illumination states of the plant lamps are repeatedly performed by day until the phase is completed. This way can simplify internal calculations and make dimming of the plant lamps more smoothly. Interruption or overlapping of the execute periods will does not occur.

The operate terminal of the present disclosure can control the plant lamps wirelessly. In this way, existing mobile devices, such as a mobile phone, can be used as an operate terminal. The mobile phone can control the plant lamps as long as being install with an APP.

The control system of the present disclosure can control the plant lamps by a control box. It should be understood that, if the number of the plant lamps assembled together is too large, and the operate terminal is directly connected to the communication module of each plant lamp, the operate terminal needs to match large number of Internet protocol address (that is, IP node) to each plant lamp, which is easy to cause network congestion and delay. By setting the control box 30, only one uniform IP node is needed to be matched to the control box 30, since the plant lamp 20 forms a wired network through the connecting lines 204, the control box 30 only needs to be electrically connected to the wired network to uniformly control the plant lamps 20 assembled together. That is, only one uniform IP node is needed to achieve uniform control of the plant lamps, which can effectively avoid network congestion and delay and especially suitable for large scale planting and a large number of plant lamps assembled together.

The control box of the present disclosure is provided with a single-chip module configured to receive and store the execution parameters. When the control box is disconnected from the operate terminal, the control box controls the plant lamps to execute the execution parameters stored in the single-chip module. By setting the single-chip module, when the execution parameters of the operate terminal cannot be obtained due to network interruption, the control box can use the same execution parameters stored in the single-chip module to continue to control the plant lamps to emit light, so as to avoid abnormal growth of plants caused by illumination interruption.

The above is detailed description of the plant lamp, the control method and the control system in embodiments of the present disclosure. In the present disclosure, the principle and embodiments of the invention are illustrated in the embodiments. The embodiments are only used to help understand the method and spirit of the invention. At the same time, an ordinary person skilled in the art, based on the spirit of the present disclosure, may made changes to the embodiments or application range. In conclusion, the above description is not intended to limit the present disclosure. Any modifications, equivalent substitutions, improvements, etc. made within the spirit and scope of the present disclosure are intended to be included within the scope of the present disclosure.

What is claimed is:

1. A plant lamp, for cooperating with a quick lock comprising an axis pin to achieve assembling, comprising a radiator member, a power box, and lamp beads, wherein the radiator member comprises an upper surface, a lower surface opposite to the upper surface, and side surfaces connecting the upper surface and the lower surface, the power box and the lamp beads are arranged on the upper surface and the lower surface respectively, and the power box is electrically connected to the lamp beads; the plant lamp further comprising at least one power socket electrically connected to the power box and a wiring module; at least one side surface of the radiator member being provided with a fixing seat, the plane where the fixing seat is located being perpendicular to the plane where the radiator member is located, the fixing seat defining a through hole therethrough, and a groove extending from a center of the through hole in two opposite directions;

when the plant lamp being assembled with another plant lamp, the side surfaces of the two plant lamps where the fixing seats are provided being fitted, and the through holes of the fixing seats being aligned; the axis pin of the quick lock going through the through holes of the two corresponding fixing seats, and rotating to be engaged into the groove of one of the fixing seat to lock the two plant lamps.

2. The plant lamp according to claim 1, wherein the radiator member is one of a three-dimensional triangle, a three-dimensional rectangle, a three-dimensional regular pentagon, a three-dimensional regular hexagon, or a three-dimensional regular octagon.

3. The plant lamp according to claim 2, wherein the radiator member is a three-dimensional rectangle, each side surface of the radiator member is provided with at least two fixing seats at interval.

4. The plant lamp according to claim 1, wherein
the axis pin of the quick lock goes through the through holes of the two corresponding fixing seats and then rotates 90 degrees and is engaged into the groove of one of the fixing seats.

5. The plant lamp according to claim 1, wherein the at least one power socket is arranged on a side of the power box, the power box is further provided with at least one data line socket arranged on a side of the power box opposite to the at least one power socket, both the number of the at least one power socket and the number of the at least one data line socket are two.

6. The plant lamp according to claim 5, wherein the plant lamp further comprises a PCB arranged on the lower surface of the radiator member, the lamp beads are arranged on the PCB away from the radiator member; the wiring module is arranged at a center of the PCB, both the power socket and the data line socket are connected to the wiring module through the power box; the data line socket is configured to be connected to an external operate terminal to achieve a wired control of the plant lamp.

7. The plant lamp according to claim 6, wherein the wiring module is provided with a communication module configured to receive wireless signals to control the lamp beads to emit light wirelessly.

8. The plant lamp according to claim 1, wherein the upper surface of the radiator member is provided with a recess, the power box is detachably connected in the recess.

9. The plant lamp according to claim 8, wherein the plant lamp further comprises a power box waterproof ring configured to seal a joint between the power box and the recess.

10. The plant lamp according to claim 6, wherein the plant lamp further comprises a light-transmitting hoard, the light-transmitting board is connected to the lower surface of the radiator member to form an accommodating space for receiving the PCB and the lamp beads.

11. The plant lamp according to claim 10, wherein the plant lamp further comprises a board waterproof ring configured to seal a joint between the light-transmitting board and the radiator member.

12. A control method of plant lamps, for controlling at least two plant lamps of claim 1, wherein the at least two plant lamps are detachably assembled together through the quick lock, the power sockets of any two adjacent plant lamps are electrically connected, and the wiring modules of any two adjacent plant lamps are connected by communication; the control method comprising the following steps:

the wiring module of each plant lamp uniformly obtaining execution parameters, wherein the execution parameters comprise phases included in a planting process, execute periods in each day within each phase, and illumination intensity in each execute period;
synchronizing the current time with the local time in user's zone;
matching the current time with a corresponding execute period, and controlling the plant lamps to emit light according to the illumination intensity corresponding to the corresponding execute period.

13. The control method according to claim 12, wherein the wiring module of each plant lamp obtains the execution parameters uniformly in a wired or wireless way.

14. The control method according to claim 12, wherein, the execution parameters are customized inputted by a user or are obtained by calling a predetermined parameter model.

15. The control method according to claim 12, wherein the execute periods are determined by dividing 24 hours of a day successively, and each execute period is circularly performed in a phase.

16. A control system of plant lamp, for controlling at least two plant lamps of claim 1, wherein the at least two plant lamps are detachably assembled together through the quick locks, the power sockets of any two adjacent plant lamps are electrically connected, and the wiring modules of any two adjacent plant lamps are connected by communication; the control system comprising an operate terminal and a time synchronization module;

wherein the operate terminal is configured to provide execution parameters needed by the plant lamps uniformly, the execution parameters comprise phases in a planting process, execute periods in each day within each phase, and illumination intensity in each execute period;
the time synchronization module being configured to synchronize the current time with the local time in user's zone and feedback the current time to the operate terminal;
the operate terminal receiving the current time from the time synchronization module, matching the current time with a corresponding execute period, and controlling the plant lamps to emit light according to the illumination intensity corresponding to the corresponding execute period.

17. The control system according to claim 16, wherein the operate terminal provides the execution parameters to each plant lamp in a wired or wireless way.

18. The control system according to claim 17, wherein the wiring module of each plant lamp comprises a communication module configured to generate an IP node, each plant lamp is connected to the operate terminal by the IP node of corresponding communication module.

19. The control system according to claim 16, wherein the control system further comprises a control box configured to be electrically connected with any one of the plant lamps and to generate a uniform IP node; the control box is connected to the operate terminal by the uniform IP node, the operate terminal controls the plant lamps uniformly through the control box.

20. The control system according to claim 19, wherein the control box is provided with a single-chip module configured to receive and store the execution parameters, the control box controls the plant lamps to perform the execution parameters stored in the single-chip module when the control box is disconnected from the operate terminal.

\* \* \* \* \*